United States Patent
Chan et al.

(10) Patent No.: US 9,428,392 B2
(45) Date of Patent: Aug. 30, 2016

(54) METHODS OF ENRICHING DIFFERENT SPECIES OF CARBON NANOTUBES

(71) Applicant: Nanyang Technological University, Singapore (SG)

(72) Inventors: Bee Eng Mary Chan, Singapore (SG); Ashok Kumar Sundramoorthy, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 14/354,450

(22) PCT Filed: Oct. 25, 2012

(86) PCT No.: PCT/SG2012/000404
§ 371 (c)(1),
(2) Date: Apr. 25, 2014

(87) PCT Pub. No.: WO2013/062488
PCT Pub. Date: May 2, 2013

(65) Prior Publication Data

US 2014/0308194 A1    Oct. 16, 2014

Related U.S. Application Data

(60) Provisional application No. 61/552,755, filed on Oct. 28, 2011, provisional application No. 61/606,013, filed on Mar. 2, 2012.

(51) Int. Cl.
*C01B 31/02* (2006.01)
*B82Y 40/00* (2011.01)
*B82Y 30/00* (2011.01)

(52) U.S. Cl.
CPC ............ *C01B 31/0273* (2013.01); *B82Y 30/00* (2013.01); *B82Y 40/00* (2013.01); *C01B 31/0266* (2013.01); *C01B 2202/02* (2013.01); *C01B 2202/22* (2013.01); *Y10S 977/845* (2013.01)

(58) Field of Classification Search
CPC ............ C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/00; B82Y 35/00; B82Y 40/00; B82Y 99/00; D01F 9/10; D01F 9/127; D01F 9/1271; D01F 9/1272; D01F 9/1273; D01F 9/1274; D01F 9/1275; D01F 9/1276; D01F 9/1277; D01F 9/1278
USPC ................ 423/447.1–447.3, 445 B, 460; 977/742–754, 842–848
See application file for complete search history.

(56) References Cited

U.S. PATENT DOCUMENTS

2006/0024871 A1   2/2006   Balasubramanian et al.
2008/0296539 A1   12/2008  Shin et al.

FOREIGN PATENT DOCUMENTS

WO   2005/012172 A2   2/2005
WO   2007/098578 A1   9/2007
(Continued)

OTHER PUBLICATIONS

Anderson et al., "Chirality Changes in Carbon Nanotubes Studied with Near-Field Raman Spectroscopy," *Nano Letters* 7(3):577-582, 2007.
(Continued)

*Primary Examiner* — Daniel C McCracken
(74) *Attorney, Agent, or Firm* — Seed IP Law Group PLLC

(57) ABSTRACT

A method of enriching specific species of carbon nanotubes by exposing a composition of carbon nanotubes to an azo compound is provided. The method includes a) mixing the azo compound with a suspension comprising the composition of carbon nanotubes to form a mixture; b) incubating the mixture to react the azo compound with the carbon nanotubes; and c) separating a supernatant and a precipitate formed in the mixture. An electrode and a field-effect transistor comprising a single-walled carbon nanotube species enriched using the method are also provided.

14 Claims, 24 Drawing Sheets

(56) References Cited

FOREIGN PATENT DOCUMENTS

| | | |
|---|---|---|
| WO | 2010/138085 A1 | 12/2010 |
| WO | 2010/151232 A1 | 12/2010 |

OTHER PUBLICATIONS

Anilkumar et al., "Noncovalent Interactions of Derivatized Pyrenes with Metallic and Semiconducting Single-Walled Carbon Nanotubes," *The Journal of Physical Chemistry C* 115:11010-11015, 2011.
Arnold et al., "Sorting carbon nanotubes by electronic structure using density differentiation," *Nature Nanotechnology* 1:60-66, Oct. 2006.
Avouris et al., "Carbon-based electronics," *Nature Nanotechnology* 2:605-616, Oct. 2007.
Bachilo et al., "Narrow (n,m)-Distribution of Single-Walled Carbon Nanotubes Grown Using a Solid Supported Catalyst," *J. Am. Chem. Soc.* 125(37):11186-11187, 2003.
Banerjee et al., "Precise positioning of single-walled carbon nanotubes by ac dielectrophoresis," *J. Vac. Sci. Technol. B* 24(6):3173-3178, Nov./Dec. 2006.
Baughman et al., "Carbon Nanotubes—the Route Toward Applications," *Science* 297:787-792, Aug. 2, 2002.
Bergeret et al., "Spectroscopic Evidence of Carbon Nanotubes' Metallic Character Loss Induced by Covalent Functionalization via Nitric Acid Purification," *J. Phys. Chem. C.* 112(42):16411-16416, 2008.
Berton et al., "Copolymer-Controlled Diameter-Selective Dispersion of Semiconducting Single-Walled Carbon Nanotubes," *Chem. Mater.* 23:2237-2249, 2011.
Bradley et al., "Flexible Nanotube Electronics," *Nano Letters* 3(10):1353-1355, 2003.
Chen et al., "Bulk Separative Enrichment in Metallic or Semiconducting Single-Walled Carbon Nanotubes," *Nano Letters* 3(9):1245-1249, 2003.
Chen et al., "Fully Printed Separated Carbon Nanotube Thin Film Transistor Circuits and Its Application in Organic Light Emitting Diode Control," *Nano Letters* 11:5301-5308, 2011.
Collins et al., "Engineering Carbon Nanotubes and Nanotube Circuits Using Electrical Breakdown," *Science* 292:706-709, Apr. 27, 2001.
Dai et al., "Selective Small-Diameter Metallic Single-Walled Carbon Nanotube Removal by Mere Standing with Anthraquinone and Application to a Field-Effect Transistor," *J. Phys. Chem. C.* 114(49):21035-21041, 2010.
Debnath et al., "A Raman spectroscopy study of the solubilisation of SWCNTs by polycyclic aromatic hydrocarbons," *Carbon* 48:1489-1497, 2010.
Doyle et al., "Structure-Dependent Reactivity of Semiconducting Single-Walled Carbon Nanotubes with Benzenediazonium Salts," *J. Am. Chem. Soc.* 130:6795-6800, 2008.
Fernando et al., "Diminished Band-Gap Transitions of Single-Walled Carbon Nanotubes in Complexation with Aromatic Molecules," *J. Am. Chem. Soc.* 126:10234-10235, 2004.
Filho et al., "Raman spectroscopy for probing chemically/physically induced phenomena in carbon nanotubes," *Nature Nanotechnology* 14:1130-1139, 2003.
Hersam, "Progress towards monodisperse single-walled carbon nanotubes," *Nanotechnology* 3:387-394, Jul. 2008.
Hofmann et al., *Carbon Nanotube Electronics*, Springer Science + Business Media, Massachusetts Institute of Technology, Cambridge, 2009, Chapter 2, "Direct Synthesis and Integration of SWNT Devices," p. 43-61.
Hong et al., "Direct Blue 71 staining of proteins bound to blotting membranes," *Electrophoresis* 21:841-845, 2000.
Itkis et al., "Purity Evaluation of As-Prepared Single-Walled Carbon Nanotube Soot by Use of Solution-Phase Near-IR Spectroscopy," *Nano Letters* 3(3):309-314, 2003.
Itkis et al., "Spectroscopic Study of the Fermi Level Electronic Structure of Single-Walled Carbon Nanotubes," *Nano Letters* 2(2):155-159, 2002.
Joselevich, "Electronic Structure and Chemical Reactivity of Carbon Nanotubes: A Chemist's View," *ChemPhysChem* 5:619-624, 2004.
Keogh et al., "Spectroscopic Analysis of Single-Walled Carbon Nanotubes and Semiconjugated Polymer Composites," *J. Phys. Chem. B.* 108:6233-6241, 2004.
Kresse et al., "*Ab initio* molecular dynamics for open-shell transition metals," *Physical Review B* 48(17):13115-13118, Nov. 1993.
Kresse et al., "Efficiency of ab-initio total energy calculations for metals and semiconductors using a plane-wave basis set," *Computational Materials Science* 6:15-50, 1996.
Kresse et al., "Efficient iterative schemes for ab initio total-energy calculations using a plane-wave basis set," *Physical Review B* 54(16):11169-11186, Oct. 15, 1996.
Krupke et al., "Separation of Metallic from Semiconducting Single-Walled Carbon Nanotubes," *Science* 301:344-347, 2003.
Krupke et al., "Simultaneous Deposition of Metallic Bundles of Single-walled Carbon Nanotubes Using Ac-dielectrophoresis," *Nano Letters* 3(8):1019-1023, 2003.
Kumar et al., "Electrochemical selective determination of ascorbic acid at redox active polymer modified electrode derived from direct blue 71," *Biosensors and Bioelectronics* 24:518-523, 2008.
Lee et al., "Selective dispersion of high purity semiconducting single-walled carbon nanotubes with regioregular poly(3-alkythiophene)s," *Nature Communications* 2(541):1-8, 2011.
LeMieux et al., "Self-Sorted, Aligned Nanotube Networks for Thin-Film Transistors," *Science* 321:101-104, Jul. 4, 2008.
LeMieux et al., "Solution Assembly of Organized Carbon Nanotube Networks for Thin-Film Transistors," *ACS Nano* 3(12):4089-4097, 2009.
Li et al., "Fabrication of carbon nanotube field effect transistors by AC dielectrophoresis method," *Carbon* 42:2263-2267, 2004.
Li et al., "Selective Deposition and Alignment of Single-Walled Carbon Nanotubes Assisted by Dielectrophoresis: From Thin Films to Individual Nanotubes," *Nanoscale Res. Lett.* 5:1072-1078, 2010.
Liu et al., "Recent Developments in Carbon Nanotube Sorting and Selective Growth," *MRS Bulletin* 35:315-321, Apr. 2010.
Lu et al., "Separated Metallic and Semiconducting Single-Walled Carbon Nanotubes: Opportunities in Transparent Electrodes and Beyond," *Langmuir* 27:4339-4350, 2011.
Martel et al., "Single- and multi-wall carbon nanotube field-effect transistors," *Applied Physics Letters* 73(17):2447-2449, Oct. 26, 1998.
Nobusa et al., "Inkjet printing of single-walled carbon nanotube thin-film transistors patterned by surface modification," *Applied Physics Letters* 99:183106-1-183106-3, 2011.
Okpalugo et al., "High Resolution XPS characterization of chemical functionalised MWCNTs and SWCNTs," *Carbon* 43:153-161, 2005.
Perdew et al., "Generalized Gradient Approximation Made Simple," *Physical Review Letters* 77(18):3865-3868, Oct. 28, 1996.
Piscanec et al., "Optical phonons in carbon nanotubes: Kohn anomalies, Peierls distortions, and dynamic effects," *Physical Review B* 75:035427-1-035427-22, 2007.
Qiu et al., "Facile and Scalable Route for Highly Efficient Enrichment of Semiconducting Single-Walled Carbon Nanotubes," *J. Am. Chem. Soc.* 131:16529-16533, 2009.
Rao et al., "Selective generation of single-walled carbon nanotubes with metallic, semiconducting and other unique electronic properties," *Nanoscale* 1:96-105, 2009.
Rehorek et al., "Characterization of sulfonated azo dyes and aromatic amines by pyrolysis gas chromatography/mass spectrometry," *Anal. Bioanal. Chem.* 388:1653-1662, 2007.
Robinson et al., "An Investigation into the Electrochemical Oxidation of Some Aromatic Amines in the Room-Temperature Molten Salt System Aluminum Chloride-*n*-Butylpyridinium Chloride," *Journal of the American Chemical Society* 102(13):4415-4420, Jun. 18, 1980.
Rouhi et al., "High-Performance Semiconducting Nanotube Inks: Progress and Prospects," *ACS Nano* 5(11):8471-8487, 2011.

(56) References Cited

OTHER PUBLICATIONS

Schmidt et al., "Labile Diazo Chemistry for Efficient Silencing of Metallic Carbon Nanotubes," *Chem. Eur. J.* 17:1415-1418, 2011.

Schmidt et al., "Mechanism of the Coupling of Diazonium to Single-Walled Carbon Nanotubes and Its Consequences," *Chem. Eur. J.* 15:2101-2110, 2009.

Šedo et al., "Laser desorption-ionization time of flight mass spectrometry of various carbon materials," *Carbon* 44:840-847, 2006.

Shin et al., "Tailoring Electronic Structures of Carbon Nanotubes by Solvent with Electron-Donating and—Withdrawing Groups," *J. Am. Chem. Soc.* 130:2062-2066, 2008.

Snow et al., "High-mobility carbon-nanotube thin-film transistors on a polymeric substrate," *Applied Physics Letters* 86: 033105-1-033105-3, 2005.

Staško et al., "Investigation of the Decomposition of Compounds Containing Azo Groups by EPR Spectroscopy," *Magnetic Resonance in Chemistry* 36:13-34, 1998.

Strano et al., "Electronic Structure Control of Single-Walled Carbon Nanotube Functionalization," *Science* 301:1519-1522, Sep. 12, 2003.

Stylidi et al., "Pathways of solar light-induced photocatalytic degradation of azo dyes in aqueous $TiO_2$ suspensions," *Applied Catalysis B: Environmental* 40:271-286, 2003.

Tanaka et al., "From metal/semiconductor separation to single-chirality separation of single-wall carbon nanotubes using gel," *Phys. Status Solidi RRL* 9:301-306, 2011.

Tanaka et al., "High-Yield Separation of Metallic and Semiconducting Single-Wall Carbon Nanotubes by Agarose Gel Electrophoresis," *Applied Physics Express* 1:114001-1-114001-3, 2008.

Trotter, "Azo Dye Tautomeric Structures Determined by Laser-Raman Spectroscopy," *Applied Spectroscopy* 31(1):30-36, 1977.

Ueno et al., "Near-Infrared Raman Spectra of Azo Dye Produced by a Nitrogen-Dioxide-Gas-Selective Coloration Reaction in a Porous Glass Chip," *Applied Spectroscopy* 55(9):1151-1155, 2001.

Usrey et al., "Evidence for a Two-Step Mechanism in Electronically Selective Single-Walled Carbon Nanotube Reactions," *J. Am. Chem. Soc.* 127:16129-16135, 2005.

Varghese et al., "Selectivity in the Interaction of Electron Donor and Acceptor Molecules with Graphene and Single-Walled Carbon Nanotubes," *The Journal of Physical Chemistry C Letters* 113:16855-16859, 2009.

Voggu et al., "A Simple Method of Separating Metallic and Semiconducting Single-Walled Carbon Nanotubes Based on Molecular Charge Transfer," *J. Am. Chem. Soc.* 132:5560-5561, 2010.

Wei et al., "Selective Electrochemical Etching of Single-Walled Carbon Nanotubes," *Adv. Funct. Mater.* 19:3618-3624, 2009.

Xu et al., "Carbon Nanotubes as Assisted Matrix Laser Desorption/Ionization Time-of-Flight Mass Spectrometry," *Anal. Chem.* 75(22):6191-6195, Nov. 15, 2003.

Zhang et al., "A Facile, Low-Cost, and Scalable Method of Selective Etching of Semiconducting Single-Walled Carbon Nanotubes by a Gas Reaction," *Adv. Mater.* 21:813-816, 2009.

Zhang et al., "Selective Etching of Metallic Carbon Nanotubes by Gas-Phase Reaction," *Science* 314:974-977, 2006.

Zhao et al., "Solution-processable semiconducting thin-film transistors using single-walled carbon nanotubes chemically modified by organic radical initiators," *Chem. Commun.*, p. 7182-7184, 2009.

Zhou et al., "p-Channel, n-Channel Thin Film Transistors and p—n. Diodes Based on Single Wall Carbon Nanotube Networks," *Nano Letters* 4(10):2031-2035, 2004.

(A)

(A)

(B)

METHODS OF ENRICHING DIFFERENT SPECIES OF CARBON NANOTUBES

CROSS-REFERENCE TO RELATED APPLICATIONS

The present application claims the benefit of U.S. Provisional Patent Application No. 61/552,755 filed on 28 Oct. 2011 and U.S. Provisional Patent Application No. 61/606,013 filed on 2 Mar. 2012, the entire contents of which are incorporated herein by reference for all purposes.

TECHNICAL FIELD

The invention relates to methods using polymers for enriching different species of carbon nanotubes.

BACKGROUND

Since their discovery, single-walled carbon nanotubes (SWNTs) have generated much interest as one of the best candidates for electronic devices due to their exceptional conductivity and field-effect transistor (FET) behavior. However, an unresolved obstacle to realization of their widespread use in applications relates to control of nanotube electronic properties.

During nanotube growth, the wrapping around and joining of a graphene sheet leads to many possible chiralities. With most growth processes, such as carbon-arc discharge, laser ablation of carbon, and chemical vapor deposition methods, about a third of the nanotube species are metallic (m-SWNTs) and the rest semiconducting (s-SWNTs).

For use as the FET active material, for example, only s-SWNTs are desired, as metallic species contribute unwanted conductance when the nanotubes are applied in transistors and electronic circuits. The poor growth selectivity of s-SWNTs and efficiency of destroying m-SWNTs during growth make efficient post-synthesis separation schemes necessary. Although methods such as alternate current (AC) dielectrophoresis, anion exchange chromatography of DNA wrapped carbon nanotubes, and density gradient centrifugation methods have been successfully employed in separation of m-SWNTs and s-SWNTs, difficulty of scaling up limits their application. Furthermore, due to subtle differences in the properties of m-SWNTs and s-SWNTs, these methods typically do not achieve a sufficiently high purity needed for practical transistors, and a tradeoff between yield and purity is required.

In view of the above, there is a need for an improved method of enriching different species of carbon nanotubes that addresses at least one of the above-mentioned problems.

SUMMARY OF THE INVENTION

In a first aspect, the invention refers to a method of enriching specific species of carbon nanotubes by exposing a composition of carbon nanotubes to an azo compound. The method comprising
 a) mixing the azo compound with a suspension comprising the composition of carbon nanotubes to form a mixture;
 b) incubating the mixture to react the azo compound with the carbon nanotubes; and
 c) separating a supernatant and a precipitate formed in the mixture.

In a second aspect, the invention refers to an electrode comprising a single-walled carbon nanotube species enriched using a method according to the first aspect.

In a third aspect, the invention refers to a field-effect transistor comprising a semiconductor single-walled carbon nanotube enriched using a method according to the first aspect.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
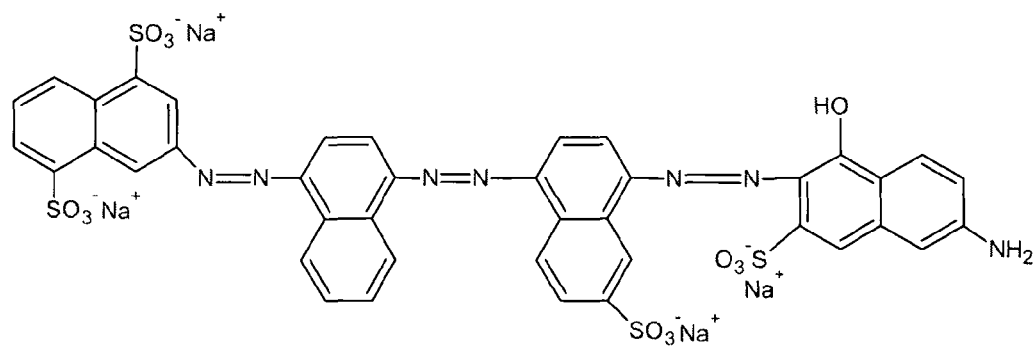
FIG. 1 depicts chemical structure of an azo compound (herein denoted as "I") according to an embodiment.

The use of an azo compound to enrich specific species of carbon nanotubes was surprisingly found by the inventors to be advantageous in that azo compounds are stable, while being capable of forming radicals by, for example, heat or agitation. By mixing an azo compound with a suspension comprising a composition of carbon nanotubes to form a mixture, and controlling the temperature and/or agitation of the mixture, the azo compounds may decompose at a slow rate to yield stable radicals and with low concentrations of the radicals in the mixture. This stability of azo compounds means that radical stoichiometry may be controlled in a simple manner to achieve a limiting concentration of radicals for m-SWNTs selectivity. Furthermore, the azo compound is doubly selective in that the intact, not decomposed azo compound molecules exhibits selectivity for s-SWNTs and selectively suspend them in solution. In view of the above, the use of an azo compound facilitates separation between the s-SWNTs (suspended by intact, not decomposed azo compounds) and the m-SWNTs (reacted with azo compound radicals), thereby enriching the respective species in the mixture.

Accordingly, in a first aspect the present invention refers to a method of enriching specific species of carbon nanotubes by exposing a composition of carbon nanotubes to an azo compound.

A carbon nanotube refers generally to a cylinder of rolled up graphitic sheets, and may exist in different forms, such as single-walled carbon nanotubes (SWNT), double-walled carbon nanotubes (DWNT), multi-walled carbon nanotubes (MWNT), or modified multi-walled carbon nanotubes.

A single-walled carbon nanotube refers to a seamless cylinder formed from one graphite layer. For example, carbon nanotubes may be described as a graphite plane (so called graphene) sheet rolled into a hollow cylindrical shape so that the structure is one-dimensional with axial symmetry, and in general exhibiting a spiral conformation, called chirality. A single-wall nanotube may be defined by a cylindrical sheet with a diameter of about 0.7 nm to about 20 nm, such as about 1 nm to about 20 nm.

Double-walled carbon nanotubes consist of two layers of graphite sheets rolled in on to form a tube shape. The two layers of graphite sheets may form a concentric cylinder. The nanotubes are considered as a cross between SWNT and MWNT, as they may have the electronic properties of the SWNT and the mechanical strength of MWNT.

Multi-walled carbon nanotubes consist of multiple layers of graphite rolled in on to form a tube shape. The nanotubes may also exist in forms in which they have hydrophilic groups such as hydroxyl group, pyrenes, esters, thiols, amines, a carboxyl group and mixtures thereof on their surface.

Single-, double- and multi-walled carbon nanotubes may equally be used in a method of the invention. In various embodiments, the carbon nanotubes are single-walled carbon nanotubes. The carbon nanotubes may be of any desired length, such as in the range from about 0.1 nm to about 10 µm, such as about 1 nm to about 5 µm, or 10 nm to about 1 µm. In one embodiment, the carbon nanotubes may be at least 1 µm or at least 2 µm, or between about 0.5 µm and about 1.5 µm, or between about 1 µm and about 5 µm.

As mentioned above, carbon nanotubes may form a one-dimensional structure with axial symmetry and exhibit a spiral conformation called chirality. The chirality of the carbon hexagon rings may depend on the arrangement of the carbon hexagon rings along the surface of the nanotubes.

The arrangement of the carbon hexagon rings may be characterized by the chiral vector of the carbon nanotubes. Chiral vector is a two dimensional vector (p, q) that is commonly used to describe the geometry of carbon nanotubes. The values of p and q determine the chirality, or "twist" of the nanotube. The chirality in turn affects properties such as conductance, density, and lattice structure of the carbon nanotubes. Depending on the arrangement of the carbon hexagon rings along the surface of the nanotube as characterized by its chiral vector, carbon nanotubes may be metallic or semiconducting.

For example, SWNTs may be metallic when p−q=3r, where r is an integer, and may be semiconducting otherwise. Metallic SWNTs refer to carbon nanotubes with non-zero density of states (DOS) at its Fermi level. The term "density of states" refers to the number of states at an energy level that are available to be occupied, and the term "Fermi level" refers to an energy level with a probability of 50 percent for existence of an electron. Therefore, a SWNT may be metallic when the DOS value at its Fermi level is not zero. Semiconducting SWNTs refer to carbon nanotubes with varying band gaps, wherein the term "band gap" refers to difference in energy between the valance band and the conduction band of a material.

The method of the first aspect may be used for enriching specific species of carbon nanotubes. The term "enriching" as used herein refers to separation or purification of different nanotubes, which may be present in the mixture, such that the content of one particular species in the volume obtained after enrichment is higher than at the beginning. The enrichment includes various degrees of purification, for example that the obtained sample volume after enrichment contains about 80%, preferably about 90%, more preferably about 95% or more of the desired species in relation to the complete population of species present in the obtained sample volume. In one embodiment, enrichment yields a unique species with specific electrical properties. In various embodiments, the single-walled carbon nanotubes are enriched according to their electronic properties. For example, through a method of the invention, metallic single-walled carbon nanotubes (m-SWNT) and semiconductor single-walled carbon nanotubes (s-SWNT) may be separated by virtue of differences in their electronic properties.

To carry out the enrichment, a suspension comprising the composition of carbon nanotubes is mixed with an azo compound to form a mixture.

As used herein, the term "azo compound" refers to a compound containing a —N=N-moiety. In various embodiments, the azo compound has the chemical formula (I) or a salt thereof

$$A\text{-}[N=N-B]_n \qquad (I)$$

wherein A and B are independently selected from monocyclic, condensed polycyclic or bridged $C_5$-$C_{20}$ aryl, 5-20-membered monocyclic, condensed polycyclic or bridged heteroaryl comprising 1 to 4 heteroatoms selected from N, O and S, or a system of two, three or four bridged $C_5$-$C_{20}$ aryl and 5-20-membered heteroaryl, wherein said aryl or heteroaryl is optionally substituted; and n is an integer of 1 to 5.

The term "monocyclic aryl" refers to a monocyclic aromatic carbon ring. Examples of monocyclic aryl groups may be, but are not limited to, phenyl and the like.

The term "condensed polycyclic aryl" refers to an aromatic carbon ring structure in which more than 1 monocyclic carbon rings are condensed or fused. Examples include naphthyl, anthracenyl, and phenanthryl.

The term "bridged aryl" refers to an aromatic carbon ring structure in which 1 aromatic carbon ring is connected to another aromatic carbon ring via a bridging group or atom, such as Si, O, S, or NH, or via a direct bond. Examples include biphenyl, triphenyl, phenyl-naphthyl, binaphthyl, diphenyl ether, diphenyl sulphide, diphenyl disulphide and the like.

The term "$C_5$-$C_{20}$", as used herein, means that the respective group has between 5 and 20 carbon atoms. In various embodiments, such a group is a $C_5$-$C_{14}$ aryl, a $C_6$-$C_{12}$ aryl, a $C_6$ aryl, a $C_{10}$ aryl, a $C_{12}$ aryl, or a $C_{14}$ aryl. In relation to a heteroaryl, this means that the heteroaryl is 5-20-membered, as 1 to 4 of the carbon atoms may be replaced by heteroatoms. Examples of heteroatoms include, but are not limited to, oxygen, sulfur, nitrogen, phosphorus, silicon, and halide. Examples of heteroaryl groups may be, but are not limited to, furan, benzofuran, thiophene, benzothiophene, pyrrole, pyridine, indole, oxazole, benzoxazole, isoxazole, benzisoxazole, thiazole, benzothiazole, imidazole, benzimidazole, pyrazole, indazole, tetrazole, quinoline, isoquinoline, pyridazine, purine, pyrazine, furazan, triazole, benzotriazole, pteridine, phenoxazole, oxadiazole, benzopyrazole, quinolizine, cinnoline, phthalazine, quinazoline or quinoxaline, and the like.

The term "5 to 20-membered", refers to the number of ring atoms including carbon and heteroatoms. In various embodiments, the number of ring atoms is from 5-14, from 5-12 or from 6-10.

The terms "monocyclic", "condensed polycyclic" and "bridged" in "5-20-membered monocyclic, condensed polycyclic or bridged heteroaryl" have the same definition as that as defined above for $C_5$-$C_{20}$ aryl, but applied in this case to 5-20-membered heteroaryl.

The term "substituted", as used herein, means that a hydrogen atom of a compound or moiety is replaced by a substituent or heteroatom. Exemplary substituents include alkoxy, aryl, aryloxy, sulfhydryl, arylthio, halogen, hydroxyl, amino, carbonyl and carboxyl. Examples of heteroatoms have already been described above.

As mentioned above, the use of an azo compound is advantageous in that azo compounds are stable and are capable of forming radicals by heat and/or agitation. In various embodiments, the azo compounds decompose at a slow rate under ambient conditions to yield stable radicals at low concentrations. This stability of azo compounds translates into process control abilities since radical stoichiometry may then be controlled in a simple manner to achieve a limiting concentration of radicals to achieve m-SWNTs selectivity. The radical species may react with the C=C double bonds on the sidewalls of SWNTs, for example, and the reaction of radicals with m-SWNTs translates into heavier m-SWNTs due to chemical binding of the radical species on the m-SWNTs. This results in enrichment of m-SWNTs in the precipitate. Besides selectivity for m-SWNTs, azo compounds have been found to be doubly selective, in that intact, not decomposed azo compound molecules selectively suspends s-SWNTs by acting as a dispersant to disperse the s-SWNTs in solution. By separating a supernatant and a precipitate formed in a mixture after addition of the azo compound, s-SWNTs and m-SWNTs may be easily separated.

In various embodiments, A and B are independently condensed polycyclic $C_5$-$C_{20}$ aryl, wherein said aryl is optionally substituted. For example, A and B may be independently from each other optionally substituted naphthalene.

In further embodiments, A and B are independently substituted with one or more electron withdrawing groups selected from the group consisting of a sulfonate group, an amino group, a hydroxy group, a halide group, a nitro group, a carboxylate group, a thiol group, and an unsaturated alkyl group. Presence of electron withdrawing groups in the azo compound may confer further selectivity to the azo compound as a dispersant for enriching specific species of carbon nanotubes. Furthermore, presence of highly solvating groups such as sulfonate groups in the azo compound is also advantageous in that no other dispersant/surfactant is required to be added into the mixture to disperse and to enrich the carbon nanotubes. In various embodiments, A and B are optionally substituted naphthalene groups and n is 2 or 3.

In one embodiment, the azo compound comprises or consists essentially of

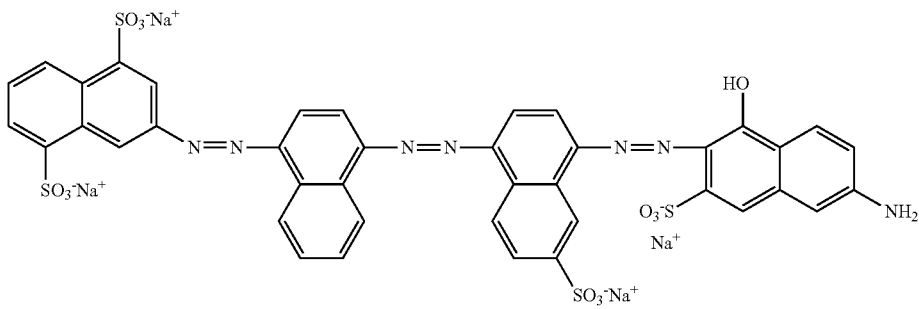

In this embodiment, the azo compound contains four naphthalene groups functionalized with ionic sulfonate groups and one hydroxy group, which preferentially disperses and suspends s-SWNTs. The azo compound may decompose to form naphthyl-based radicals, such that upon incubation, the naphthyl-based radicals preferentially react with m-SWNTs to form hybrids having higher masses than s-SWNTs. This makes m-SWNTs heavier, resulting in enrichment of m-SWNTs in the precipitate. In various embodiments, the naphthyl group stabilizes the radicals formed due to resonance stabilization afforded with the naphthyl group.

The amount of azo compound to be used in the solution may depend on the type of azo compound and the amount of carbon nanotubes present. Generally, the concentration of the azo compound in the solution may be in the range of about 0.01 mM to about 1 mM, such as about 0.1 mM to about 1 mM, about 0.5 mM to about 1 mM, about 0.01 mM, or about 1 mM.

Mixing of the azo compound with the suspension comprising the composition of carbon nanotubes may be carried out by standard mixing methods known in the art. Any suitable mixing device may be used. In various embodiments, the mixing may be carried out by sonicating or stirring or shaking the mixture. The mixing time may vary depending on the type and concentration of the carbon nanotube mixture, and/or the azo compound used.

In various embodiments, the mixing is carried out for about 1 to about 60 minutes, such as about 1 to about 30 minutes or about 1 to about 10 minutes. For example, the mixing time may be, but is not limited to, about 1 min, about 2 min, about 3 min, about 4 min, about 5 min, about 6 min, about 7 min, about 8 min, about 9 min, about 10 min, about 15 min, about 20 min, about 25 min, about 30 min, about 35 min, about 40 min, about 45 min, about 50 min, about 55 min, or about 60 min. All of the mentioned time specifications may be the lower or upper limit of a respective time range. In embodiments where sonication is used as the mixing method, wattage on the sonicator may additionally be varied to achieve a specific level of mixing. A person skilled in the art is able to choose and determine the appropriate mixing time and settings based on the mixing method used to derive a specific enrichment of the carbon nanotubes or SWNTs.

The method may further comprise heating the mixture. As mentioned above, azo compounds are capable of forming radicals by, for example, heat and/or agitation. Therefore, apart from agitation, heating the mixture may additionally be used to control the amount of radicals being formed. The mixture may be heated at a temperature of about 50° C. to about 90° C., such as about 50° C. to about 75° C., about 50° C. to about 60° C., or about 60° C. In one embodiment, the mixture is heated at a temperature of about 60° C.

After mixing, the resulting mixture is incubated for a specific period of time to react the azo compound with the carbon nanotubes. The term "incubation" as used herein means letting the mixture stand for a particular period of time. The incubating may allow decomposition of the azo compound to form radicals, and/or interaction of the azo compound with the m-SWNTs and s-SWNTs. The amount of standing time may affect the efficiency of enrichment. Generally, a longer standing time results in higher selectivity.

In various embodiments, the incubation is carried out for a period of time of between about 24 hours to about 4 weeks, such as between about 24 hours and about 3 weeks, or between about 48 hours and about 2 weeks. In various embodiments, the incubation is carried out for a period of time of about 5 days.

During incubation, a supernatant and a precipitate is formed in the mixture, which may be separated subsequently. In various embodiments, about 50% of the supernatant are separated from the mixture, such as about 60%, about 70%, about 80%, or about 90%. In other embodiments, about 50% of the precipitate is separated from the mixture, such as about 60%, about 70%, about 80%, or about 90%.

In various embodiments, the separating step comprises centrifuging the mixture. The mixture may be centrifuged before separating the supernatant and the precipitate formed during incubation. In various embodiments, centrifugation is carried to form the supernatant and the precipitate in the mixture. The centrifugation may be carried out for at least about 5 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, or at least about 55 minutes. In one embodiment, the centrifugation is carried out for 1 hour. The centrifugation speed may be, but is not limited to, about 10,000 g, about 30,000 g, about 50,000 g or more. In one embodiment, the centrifugation speed is about 50,000 g.

The carbon nanotubes comprised in the supernatant and/or the precipitate may be washed with an aqueous solution after separation. In so doing, azo compounds which may be physically adsorbed on the carbon nanotubes may be removed. In various embodiments, the aqueous solution may be water or distilled water.

The carbon nanotube species, such as SWNTs enriched using a method of the invention, may be used as electrode material for forming an electrode. Accordingly, in a second aspect, the invention refers to an electrode comprising a single-walled carbon nanotube species enriched using a method according to the first aspect.

For example, the electrodes manufactured using those enriched SWNTs may be used for batteries, such as metal-air batteries. Examples for metal-air batteries include a lithium, aluminium, carbon, zinc-air battery in which at least one electrode is made of carbon. They may also be used for fuel cells. In case they are used in fuel cells, catalytic noble metal materials in particulate form may be added to the electrode.

In a third aspect, the invention refers to a field-effect transistor (FET) comprising a semiconductor single-walled carbon nanotube enriched using a method according to the first aspect.

The SWNTs enriched by a method of the first aspect may be used to form a FET. The FET structure may include two metal electrodes designated as "source" and "drain" connected by a semiconducting channel. In conventional devices, the channel is made of silicon (Si). In the FET of the present invention, the channel is replaced by s-SWNTs enriched by methods according to the invention.

Apart from the applications mentioned above, the single-walled carbon nanotube enriched using a method of the invention may also be used as an optical or an optoelectronic device, such as transistors, memory devices and optoelectronic couplers.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1

Chemicals and Reagents (Embodiments 1 and 2)

P2-SWNTs were purchased from Carbon Solutions, Inc. (CA, USA). Direct blue 71 (DB71) (I), sodium dodecyl sulphate (SDS) and sodium cholate (SC) were purchased from Sigma-Aldrich, USA. All other chemicals were ultrapure analytical grade reagents and were used without further purification.

Example 2

Separation of SWNTs (Embodiment 1)

Solution processing of pristine P2-SWNTs was carried out in the following manner.

A solution of 15 mg arc-discharge P2-SWNTs in $1 \times 10^{-3}$ M solution of I in water was stirred and heated at 60° C. for 45 min, and then ultrasonicated with an ultrasonic probe. After ultrasonication, the resulting solution was kept standing for two days at room temperature (Step (i) of FIG. 2).

Figure 2:
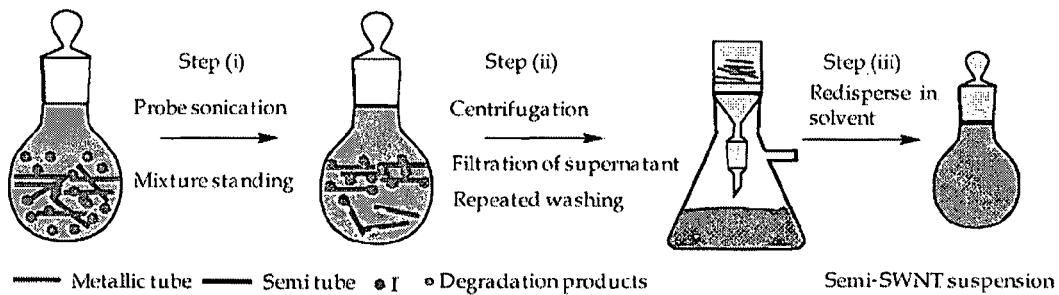
FIG. 2 is a schematic diagram showing method of enriching semiconducting SWNT according to various embodiments using I.

In Step (ii) of FIG. 2, P2-SWNT/I solution was transferred into centrifuge tubes and then centrifuged at 50,000 g with a fixed angle rotor for 1 hr. The supernatant SWNT (Supt-SWNT) solution was quickly decanted from the tube without disturbing the precipitate. The separated Supt-SWNT solution was washed with doubly distilled water through a polycarbonate membrane having pore size 0.2 μm, to remove excess or un-reacted I molecules from the SWNTs. The solids on the filter were then washed repeatedly several times with distilled water.

Finally, the separated Supt-SWNTs were re-dispersed in 1% sodium dodecyl sulphate (SDS) and sodium cholate (SC) co-surfactant solution (1:4 SDS/SC) with an ultrasonic probe for 30 min (Step (iii) of FIG. 2).

Precipitated-SWNTs (Ppt-SWNTs) (collected from Step (ii) of FIG. 2) were redispersed in 1% surfactant solution (1:4 SDS/SC) after repeated washing with doubly distilled water.

Example 3

Density Gradient Ultracentrifugation (DGU) (Embodiment 1)

A density gradient column was formed in a 13 mL centrifuge tube by layering with increasing concentrations of iodixanol (Optiprep, Sigma-Aldrich). The bottom layer was filled with 50% w/v iodixanol, followed by 40%, 30%, and 20% w/v iodixanol as the top layer of the density gradient. Each layer contained 1% w/v sodium cholate (SC, 99%, Sigma-Aldrich).

The P2-SWNT/I solution to be ultracentrifuged was prepared as described above in Example 2, up to the point of centrifugation. After two days standing, the P2-SWNT/I solution containing both s-SWNTs and m-SWNTs was filtered/washed with distilled water through a 0.2 μm pore polycarbonate membrane, and the solids were redispersed in 1% SC solution. For the control experiment, Pristine P2-SWNTs (without I) were dispersed in 1% SC. The P2-SWNT/USC or P2-SWNT/SC solution was inserted on top of the density gradient column with a syringe. Density gradient ultracentrifugation was performed at RCF (relative centrifugal force) max 200,000 g for 6 hours using a Hitachi CP100WX P40ST swing-bucket rotor. After ultracentrifugation, the layers of the stratified column were successively extracted with a micropipette.

Example 4

Characterization of SWNTs (Embodiment 1)

UV-VIS-NIR absorption spectra were measured using a Varian Cary 5000 UV-VIS-NIR spectrophotometer. The semiconducting purity of the separated Supt s-SWNT sample was estimated through calculation of the ratio $A_S/A_M+A_S$, where $A_S$ and $A_M$ are respectively the areas of the $S_{22}$ and $M_{11}$ absorption peaks after baseline subtraction.

Raman spectra were measured with a Renishaw Raman scope in backscattering configuration using 633 nm wavelength laser over SWNT solid samples. Laser power of 2.5-5.0 mW was used to prevent destruction of the SWNT samples during measurement.

A MALDI-TOF/TOF-MS (Model 4800, AB SCIEX, Toronto, Canada) was used to measure the molecular weight (MW) of the molecules. The laser power was set to 3500 units. Mass spectra (MS) were acquired in positive reflector mode with 900 laser shots.

Atomic force microscopy (AFM) was conducted using a MFP 3D microscope (Asylum Research, Santa Barbara, Calif.) with a cantilever (Arrow N.C., Nanoworld) in AC mode. The scan rate was set to 1 Hz at various scan sizes.

X-ray photoelectron spectroscopy (XPS) measurements were made using a Kratos Axis-ULTRA X-ray photoelectron spectroscope with a monochromatic Al-Ka' X-ray source (1486.7 eV) in an ultrahigh-vacuum environment of $10^{-9}$ Torr. Survey spectra were made with a pass energy of 160 eV and a step size of 1 eV and high-resolution spectra were made with a pass energy of 40 eV and a step size of 0.1 eV.

Example 5

Field Effect Transistor Fabrication (Embodiment 1)

Field effect transistors were fabricated by alignment of purified s-SWNTs in the channel regions of pre-patterned electrodes using an applied AC electric field. A frequency generator was used to apply 3 V (peak-to-peak) at 2 MHz across the source and drain electrodes.

10 μL of the s-SWNT suspension was placed on each channel gap of the electrode-patterned substrate using a pipette and was aligned for 10 sec under the AC electric field. After 10 sec, the SWNT suspension was gently blown off and the sample was characterized with AFM. Back-gated SWNT-FETs were fabricated on a heavily doped p-type silicon wafer capped with a 300 nm thick thermally grown silicon dioxide ($SiO_2$) layer. Heavily doped p-type silicon was used as the back-gate. The source and drain electrodes were deposited as 5 nm/50 nm (Ti/Au) with channel length (L) of 2-3 μm.

To estimate the effective hole mobility ($\mu_{eff}$) of s-SWNT FET devices, the following equation was adopted:

$$\mu_{eff} = \frac{L}{C/L} \cdot \frac{1}{V_d} \cdot \frac{dI_d}{dV_g} \quad (1)$$

where L is the channel length, $I_d$ is the drain current, $V_g$ is the gate voltage, $$C/L = 2\pi\varepsilon\varepsilon_{ox} / \ln\left(\frac{2h}{r}\right)$$

is the gate capacitance per unit length, r and h are radius of the SWNTs and the equivalent oxide thickness of $SiO_2$ (dielectric) (300 nm), and $\varepsilon_{ox}$ is the permittivity of the $SiO_2$ (3.9).

Example 6

Density Functional Calculations (Embodiment 1)

The bonding with SWNT sidewall of radicals resulting from the decomposition of I was numerically simulated. All the calculations in the computer simulations were performed using generalized gradient approximation Perdew-Burke-Eznerhof (GGA-PBE) method as implemented in Vienna Ab initio Simulation Package (VASP). A 1×1×1 grid for k-point sampling and an energy cutoff of 400 eV were used throughout the calculations. All atomic coordinates were optimized until the forces acting on each atom were less than 0.01 eV/Å.

2-naphthyl radical was used as the model radical from decomposed I to understand the interaction between I and its DPs with SWNTs. Semiconducting SWNT species (12,8) and (19,0) and metallic species (15,3) and (18,0), all with diameters of about 14 Å, were selected as representative of the species distribution of arc-discharge P2-SWNTs.

Example 7

UV-VIS-NIR Spectroscopy Results (Embodiment 1)

Figure 3:
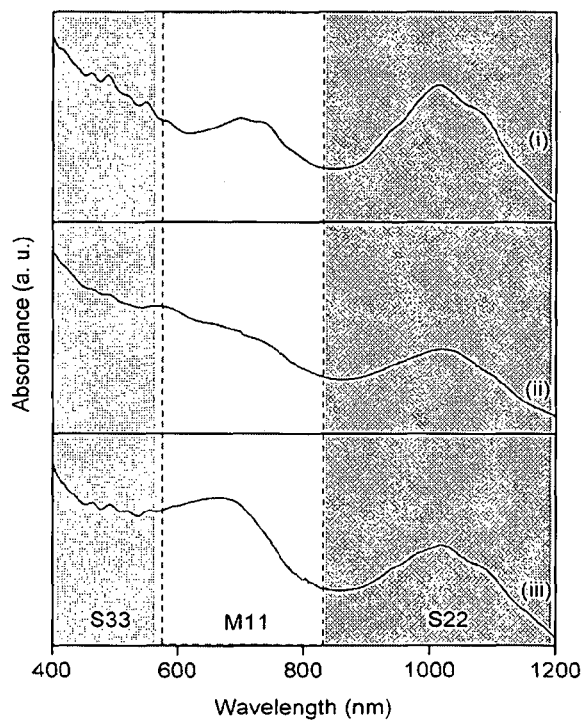
FIG. 3 are graphs showing (A) UV-VIS-NIR spectra of SWNT samples with centrifugation for (i) Pristine P2-SWNT, (ii) separated supernatant s-SWNTs (Supt s-SWNTs), and (iii) separated precipitated m-SWNTs (Ppt m-SWNTs); and (B) Raman spectra of SWNTs samples with centrifugation for (i) Pristine P2-SWNT, (ii) separated Supt-SWNTs and (iii) Ppt-SWNTs.
Figure 3:
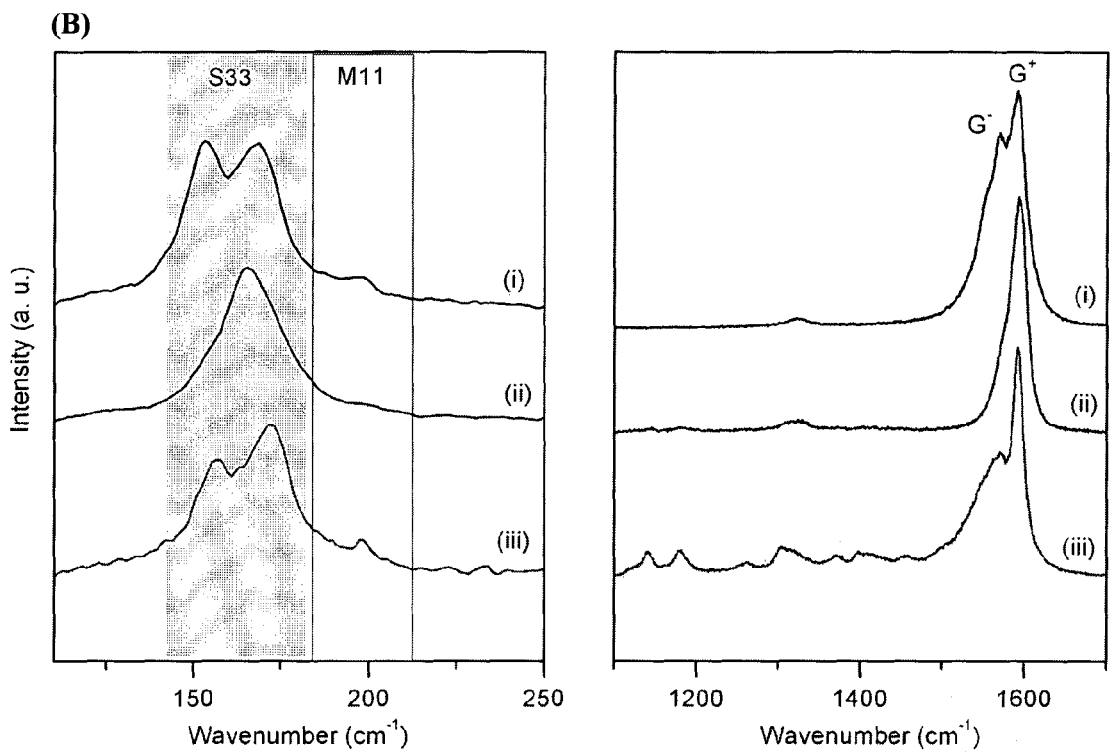

UV-VIS-NIR spectroscopy has been reported to be an important tool for characterizing the metallicity and electronic band structure of SWNTs. FIG. 3A shows the UV-VIS-NIR absorption spectra of (i) Pristine P2-SWNTs, (ii) separated Supt-SWNTs (predominantly s-SWNTs) and (iii) Ppt-SWNTs (significantly enriched in m-SWNTs), all dispersed in a 1% co-surfactant SDS/SC (1:4) solution. The first interband transition for metallic tubes, $M_{11}$ (peak at 719 nm), and the third and second interband transitions for semiconducting tubes, $S_{33}$ (460-488 nm) and $S_{22}$ (920-1120 nm), were indicated.

For the Supt-SWNTs sample (FIG. 3A, curve (ii)), the peak corresponding to the metallic band ($M_{11}$) was suppressed. For the Ppt-SWNTs sample (FIG. 3A, curve (iii)), the $M_{11}$ metallic band remained prominent and had amplitude relative to the $S_{22}$ peak that was much larger than that of curve (ii). $S_{22}$ peak in the UV-VIS-NIR spectra may be used for purity evaluation because it is less affected by doping during chemical purification than the $S_{33}$ peak. Accordingly, the purity of the various fractions was estimated through comparison of the $M_{11}$ and $S_{22}$ peak areas of the respective spectra.

In the separated Supt-SWNT suspension, the semiconducting SWNT purity was evaluated to be 96%, compared with 75% and 60% for Pristine P2-SWNTs and Ppt-SWNTs respectively. Based on the measured weight after the separation, the yield of s-SWNTs in the Supt-SWNTs fraction was estimated to be 42% of the original P2-SWNTs semiconducting species content. Hence, the Supt-SWNTs sample was depleted, and the Ppt-SWNTs sample was enriched, in m-SWNTs with respect to s-SWNTs.

Example 8

Raman Spectroscopy Results (Embodiment 1)

Raman spectroscopy has been extensively used to investigate the electronic and vibrational properties of SWNTs. To evaluate the separation of s-SWNTs, Raman spectra were recorded using a Helium-Neon laser (633 nm), which resonantly probes both m- and s-arc discharge SWNTs. It should be noted that the single laser wavelength used only allows detection of some diameter species present. 633 nm laser is useful for characterizing arc discharge SWNTs with diameter range of 1.32 nm-1.72 nm.

FIG. 3B, left panel displays the Raman spectra in the radial breathing mode (RBM) range of (i) pristine, (ii) separated Supt-SWNT, and (iii) separated Ppt-SWNT samples. The lower frequency RBMs (135-180 cm$^{-1}$, $S_{33}$) may be attributed to semiconducting nanotubes with diameters calculated to be about 1.54 nm, due probably to the species (20, 0), a zigzag tube, and/or (12, 11) or (16, 6), which are chiral tubes. The higher frequency RBMs (183-210 cm$^{-1}$, $M_{11}$) may be attributed to metallic nanotubes with average diameter of 1.32 nm, possibly a (16, 1) or a (15, 3) chiral tube. Compared to pristine nanotubes (FIG. 3B, left panel, curve (i)), higher frequency RBMs were absent from the spectrum of the Supt-SWNT sample (FIG. 3B, left panel, curve (ii)), confirming that the metallic nanotubes fraction was highly depleted in Supt-SWNT, which was essentially a s-SWNT enriched solution.

Also, in the Raman spectra (FIG. 3B, right panel), the frequency range between 1450 and 1700 cm$^{-1}$ shows the nanotube tangential modes with the characteristic G$^+$ and G$^-$ features. For the pristine sample (i), the G$^-$ mode (at 1563 cm$^{-1}$) was broad and asymmetrical with a Breit-Wigner-Fano profile because of phonon-plasmon coupling with a continuum of states present only in metallic nanotubes. The G$^-$ band area in the Supt-SWNT sample (FIG. 3B, right panel, curve (ii)) was smaller than that of pristine SWNTs (FIG. 3B, right panel, curve (i)), corroborating the RBM mode data that metallic nanotube content was diminished in Supt-SWNTs. In addition, comparison of the Raman spectra of (iii) Ppt-SWNTs with (i) pristine SWNTs (FIG. 3B, right panel), showed that the relative area of the G$^-$ band in (iii) was highly enhanced compared with (i), which is a unique behavior characteristic of metallic tubes, indicating enhanced metallic content in the separated Ppt-SWNTs.

Example 9

Density-Gradient Ultracentrifugation (DGU) Results (Embodiment 1)

Density-gradient ultracentrifugation (DGU) is a standard sorting technique that allows SWNTs to be separated by their buoyant density in a surfactant solution. A buoyancy contrast was expected between m-SWNTs and s-SWNTs after treatment with I. DGU was used to separate I-treated SWNTs dispersed in a surfactant solution (1% SC).

Figure 4:
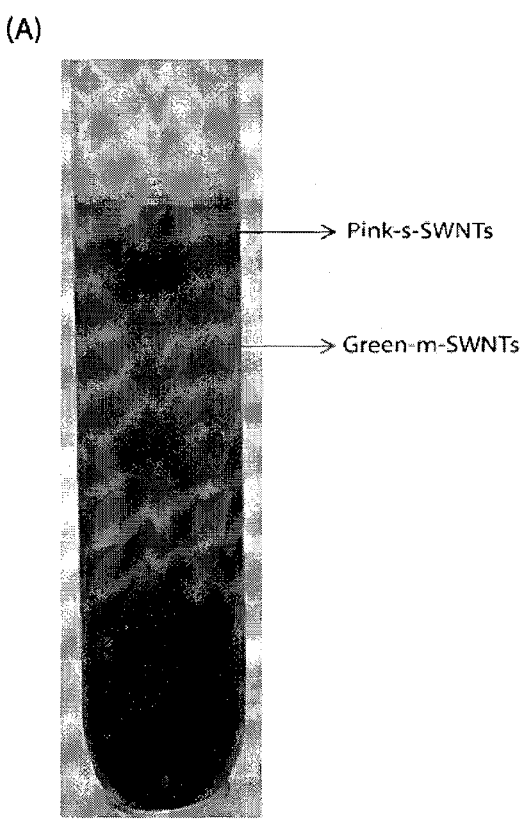
FIG. 4(A) is a photograph showing a test tube of I treated SWNTs separated by density-gradient ultracentrifugation (DGU).
FIG. 4(B) to (D) are graphs showing (B) UV-VIS-NIR spectra of SWNT fractions with DGU for (i) Pristine P2-SWNT, (ii) separated pink fraction enriched in s-SWNTs, and (iii) separated green fraction enriched in m-SWNTs; (C) and (D) Raman spectra of I treated SWNTs samples with DGU for (i) Pristine P2-SWNT, (ii) separated s-SWNT, and (iii) m-SWNT.
Figure 4:
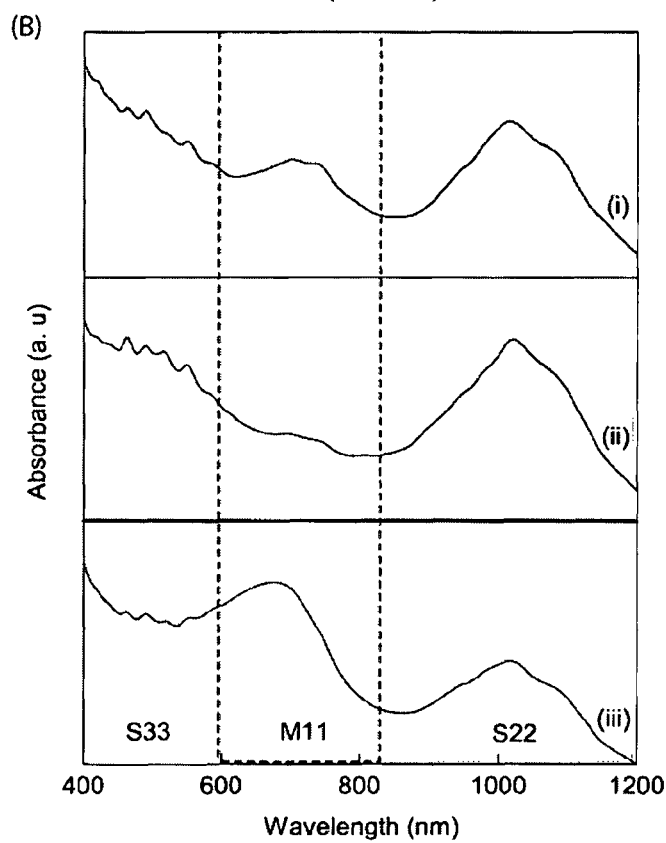
Figure 4:
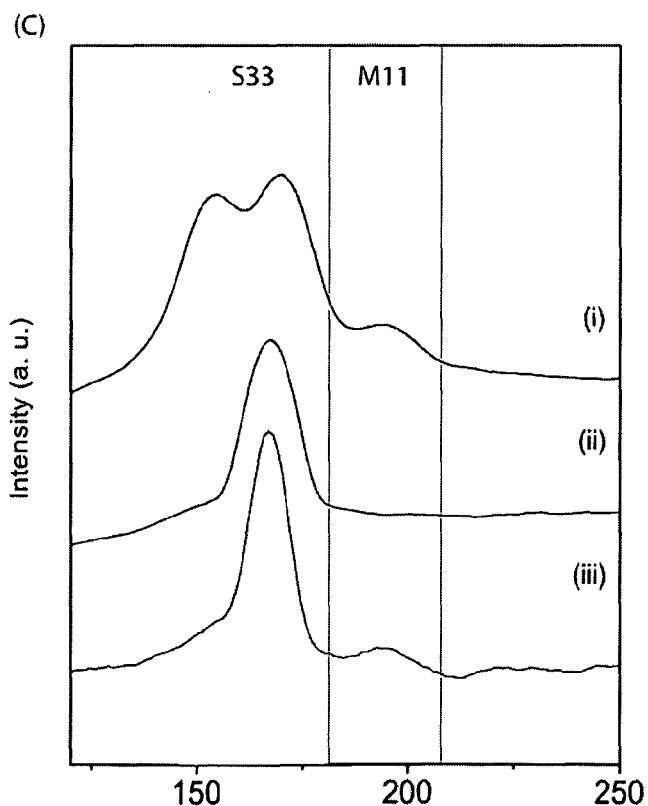
Figure 4:
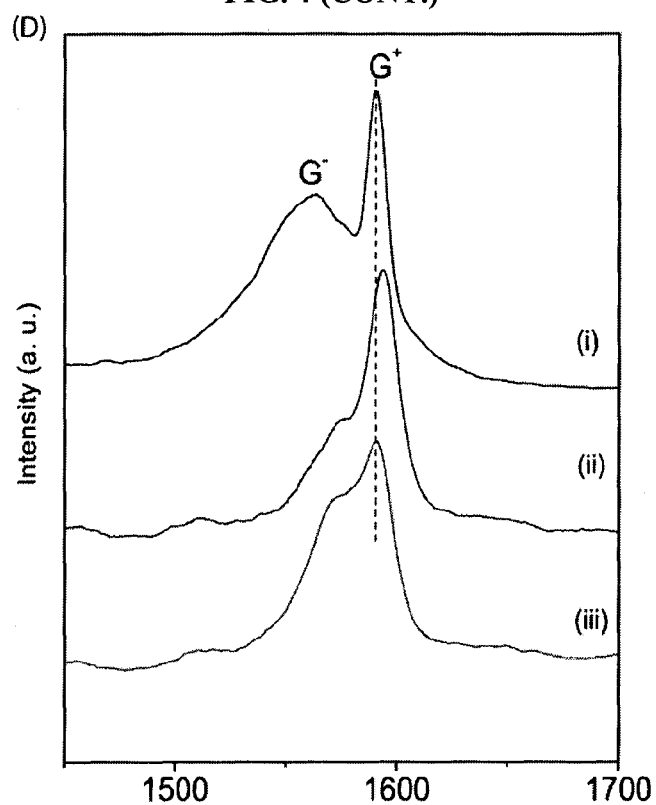
Figure 9:
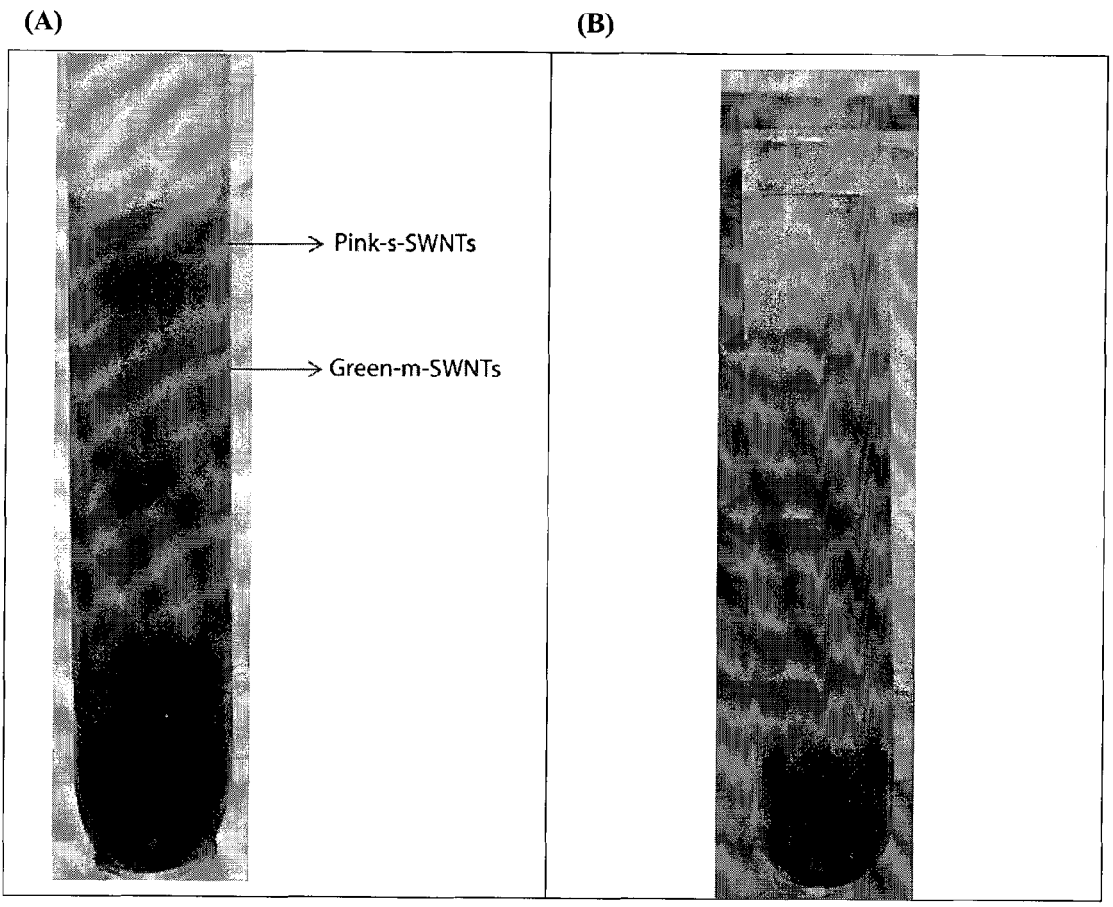
FIG. 9 are photographs showing (A) a test-tube of I treated SWNTs separated by DGU; and (B) pristine P2-SWNTs separated by DGU and used as a control.

FIG. 4A shows DGU separated SWNTs in a centrifuge tube. Three different colored layers were identified and the two upper layers were carefully extracted (without mixing) using a micro syringe, stored in different glass vials and characterized with UV-VIS-NIR and Raman spectroscopies. The pink fraction was identified to be s-SWNTs, and the green fraction to be m-SWNTs. The purity of the s-SWNTs was estimated as described previously, and found to be about 99%. (In a control experiment, pristine P2-SWNTs was dispersed in 1% SC to separate SWNTs by DGU. As shown in FIG. 9, SWNT separation by metallicity was not achieved without I treatment).

For the pink fraction, the RBM region of the Raman spectrum (FIG. 4C, curve (ii)) was visibly devoid of the $M_{11}$ peak, confirming the pink fraction to be s-SWNTs enriched. For the same pink fraction, the metallic G$^-$ peak was also dramatically diminished (FIG. 4D, curve (ii)), more so than in the standard centrifugation separation (FIG. 3B, right panel, curve (ii)). For the green fraction, the metallic G$^-$ peak (FIG. 4D, curve (iii)) was enhanced with respect to the pink fraction (ii), and the $M_{11}$ RBM peak was also present (FIG. 4C, curve (iii)), indicating enrichment of m-SWNTs in this fraction. This shows that very high semiconducting purity SWNTs may be produced with I standing and DGU, but the yield was lower than that achieved by the regular centrifugation method (FIG. 3) described earlier, and all further experiments and analysis reported below focused on the SWNT fractions separated by the high-s-yield regular centrifugation method.

Example 10

Results of FET Tests (Embodiment 1)

A further test for enrichment of s-SWNTs, or depletion of m-SWNTs, in Supt-SWNTs (without DGU) is the performance of transistors which employ enriched Supt-SWNTs as the active material. This kind of device is in demand for flexible electronics and sensors.

Figure 5:
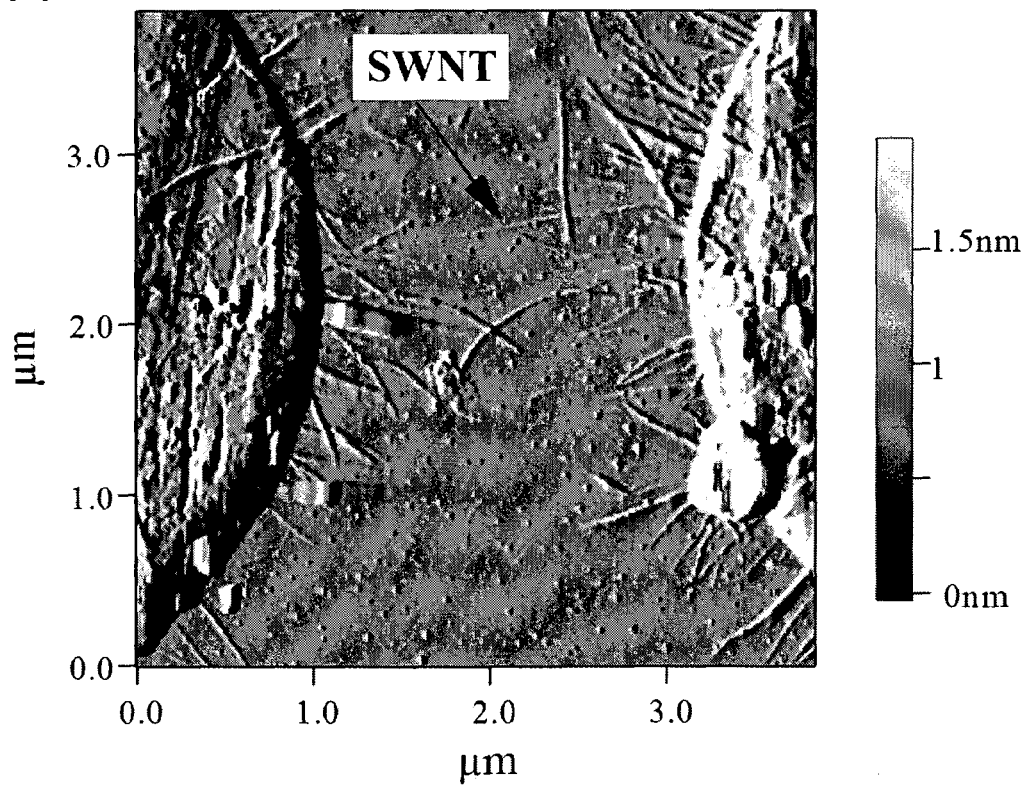
FIG. 5(A) is an atomic force microscopy (AFM) image of a bridged s-SWNT field-effect transistor.
FIG. 5(B) is a graph showing output curves for an as-prepared s-SWNT-FET as a function of gate voltage from +16 to −16 V in steps of 4 V (output curves shown ordered in direction of arrow).
FIG. 5(C) is a graph showing transfer characteristics of a representative s-SWNT FET device at $V_{ds}$=0.2 V.
FIG. 5(D) is a histogram graph of on/off ratios of fabricated FET devices for (i) FETs fabricated with enriched semiconductor SWNTs (s-SWNT/FETs), and (ii) FETs fabricated with pristine SWNTs (P2-SWNT/FETs).
Figure 5:
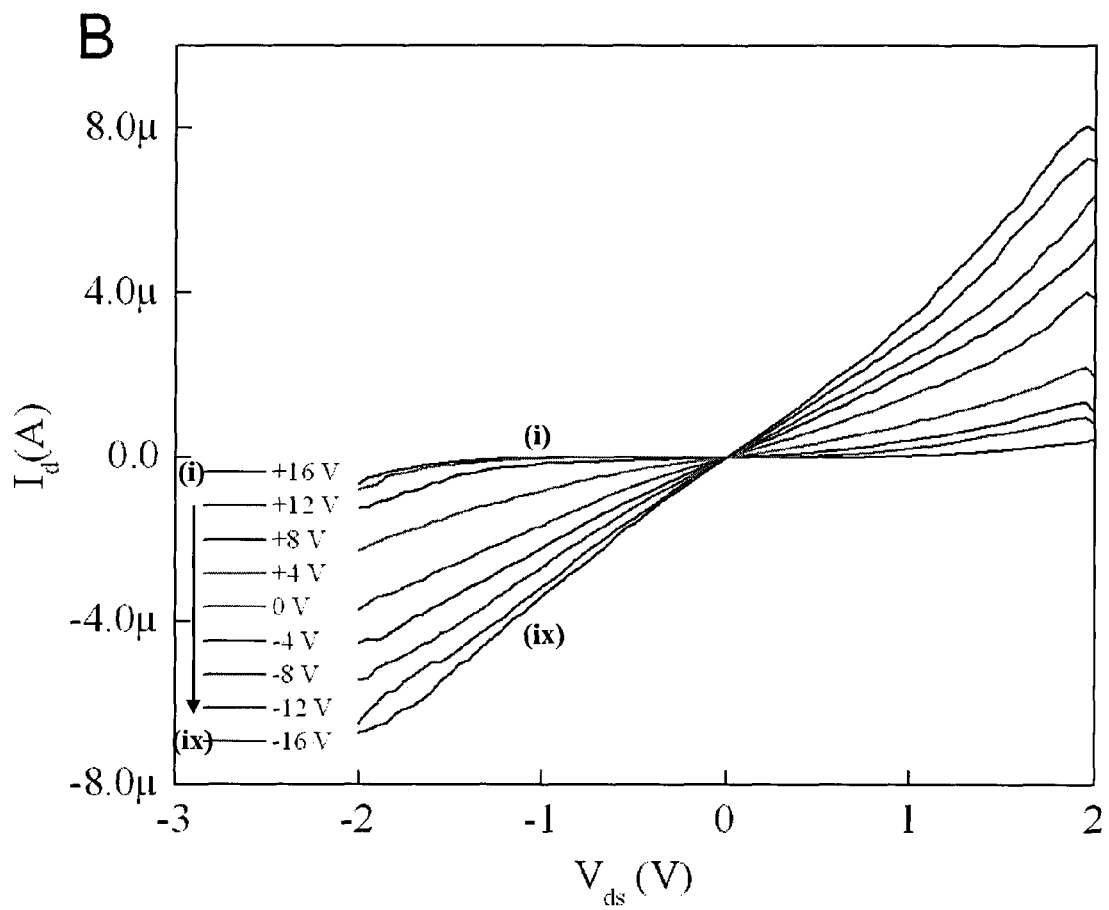
Figure 5:
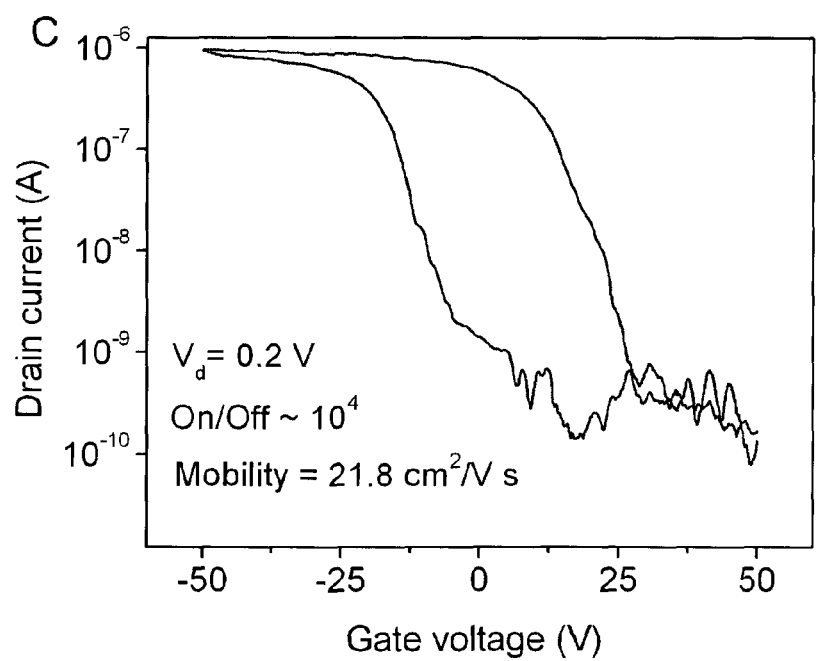
Figure 5:
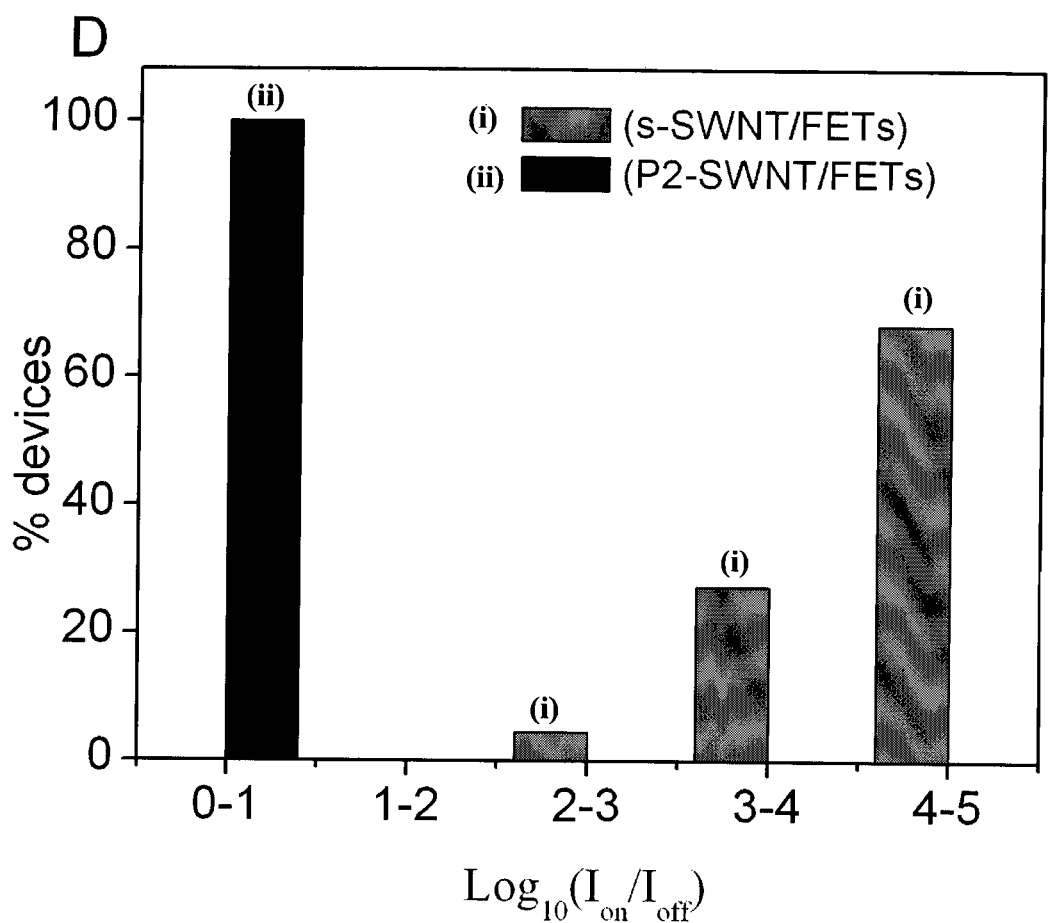
Figure 10:
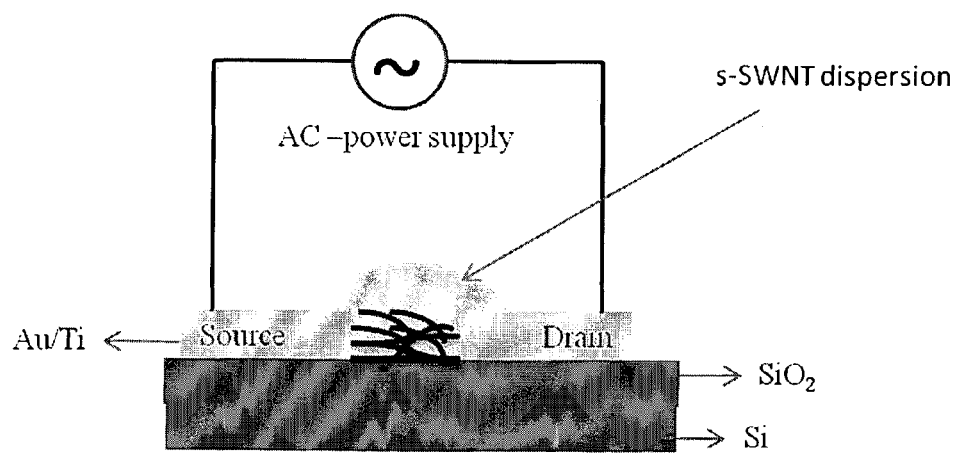
FIG. 10 is a schematic diagram showing (AC-) dielectrophoresis method of field-effect transistor fabrication. Back-gated SWNT-FETs were fabricated on a heavily doped p-type silicon wafer capped with a 300 nm thick thermally grown silicon dioxide ($SiO_2$) layer. Heavily doped p-type silicon was used as the back-gate. The source and drain electrodes were deposited as 5 nm/50 nm (Ti/Au) with the channel length (L) of 2-3 µm.

Field effect transistor (FET) devices (SiO$_2$ gate oxide layer=300 nm) were fabricated by depositing/orienting s-SWNTs in the FET channel through alternating current (AC) dielectrophoresis method (FIG. 10). AFM imaging of the devices showed that few single nanotubes bridged the source and drain electrodes (FIG. 5A). The s-SWNT tubes appeared to be relatively straight and aligned parallel to one another. The resistance of the s-SWNT devices was approximately 3 to 4 MΩ, which was higher than other reported SWNT field effect transistors prepared by AC dielectrophoresis method, because they have used unseparated nanotube samples containing metallic nanotubes. The higher resistance of devices fabricated herein suggested that the aligned tubes on the channel were significantly depleted in m-SWNTs.

As shown in FIG. 5B, FETs based on the as-separated s-SWNTs showed a typical p-type field effect characteristic of s-SWNTs in ambient conditions, with the drain current increasing with increasing negative gate voltage. In FIG. 5C, transfer characteristics of a back-gated s-SWNT device was shown. The as-prepared device was a p-type FET with $I_{on}$~1 µA, and the threshold slope was 1000 mV/decade. More than 25 FET devices were investigated and the on/off ratios were found to range from about 10$^2$ to about 10$^5$, with the distribution weighted toward the high end of this range. FIG. 5D shows the distribution of ON/OFF ratios for s-SWNT/FET devices prepared from the separated Supt s-SWNT solution. For comparison, devices prepared with the same procedure using pristine-P2-SWNT solution were also shown. The devices made with unseparated SWNTs all had ON/OFF ratios less than 10. The best device using the s-SWNTs exhibited an estimated hole mobility of 21.8 cm$^2$/V s, with on/off ratio of 10$^4$ (FIG. 5C). The demonstrated method represents a simple and convenient way to provide the s-SWNTs necessary for high performance solution processable SWNT-FET devices.

Figure 11:
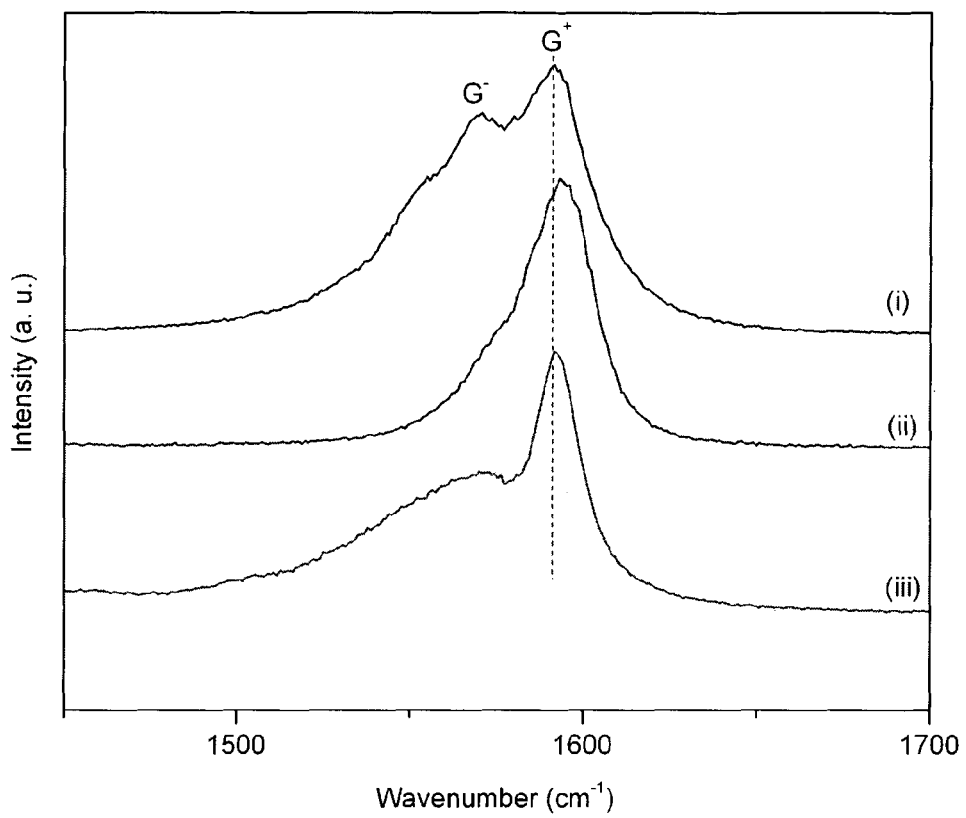
FIG. 11 is a graph showing Raman spectra of SWNTs samples with centrifugation; (i) pristine P2-SWNT, (ii) separated Supt-SWNTs, and (iii) Ppt-SWNTs. (This is an enlarged image of FIG. 3B).

It is postulated that there was preferential molecular charge transfer between undecomposed I and the s-SWNTs. This is evident from the upshift by 1.8 cm$^{-1}$ of the Raman G$^+$ peak of the Supt-s-SWNTs sample compared with the pristine sample (FIG. 11). On the other hand, the Ppt-s-SWNTs sample did not show any upshift. The Raman upshift may be attributed to charge transfer from SWNTs to electron-withdrawing sulfonate group-functionalized naphthalene. The molecular charge transfer also affected the broadness of the G$^-$ band and electron-withdrawing groups were known to reduce the broadness of the G$^-$ band.

Example 11

X-Ray Photoelectron Spectroscopy (XPS) Results (Embodiment 1)

Figure 12:
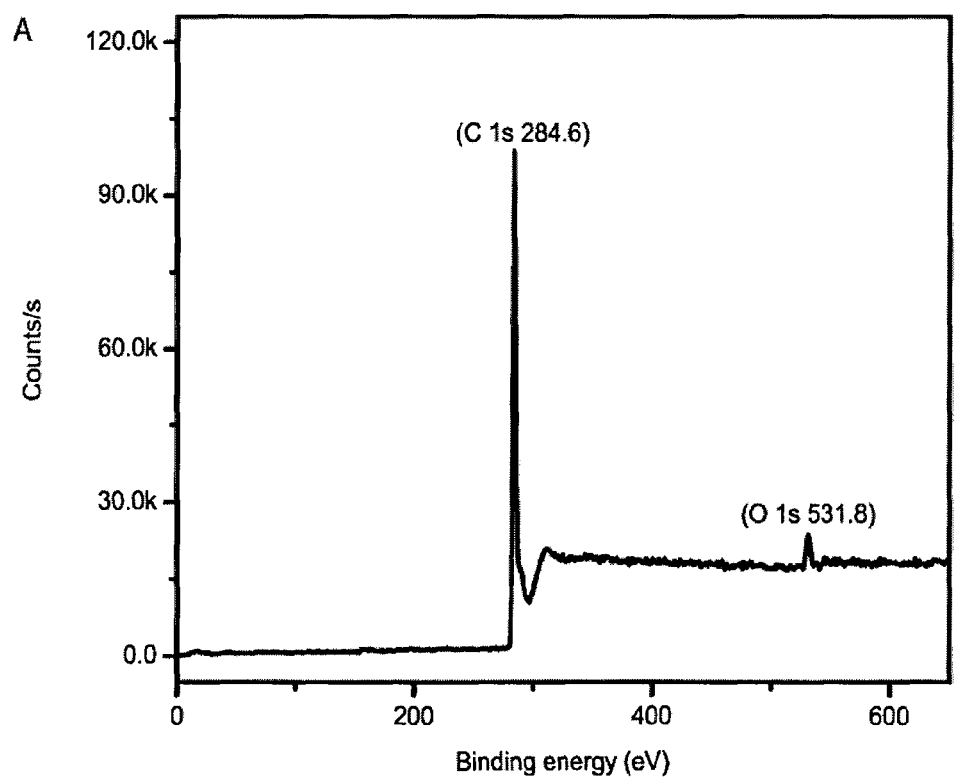
FIG. 12 are graphs showing X-ray photoelectron spectra of (A) Pristine P2-SWNTs, (B) Supt-SWNTs, and (C) Ppt-SWNTs.
Figure 12:
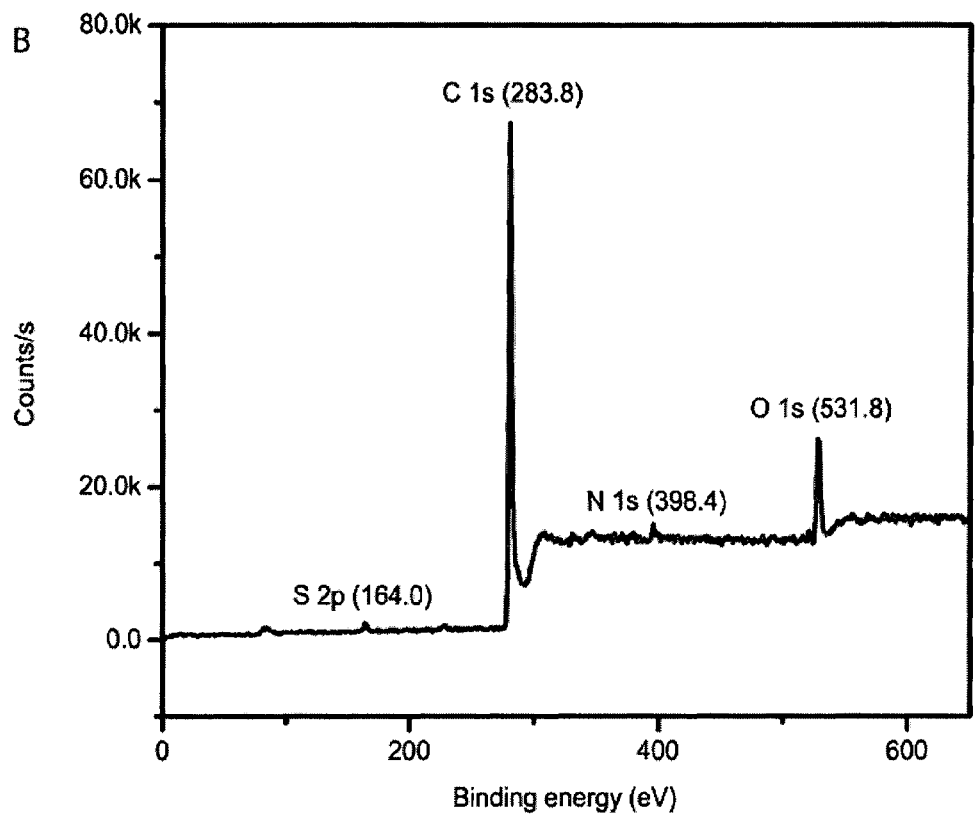
Figure 12:
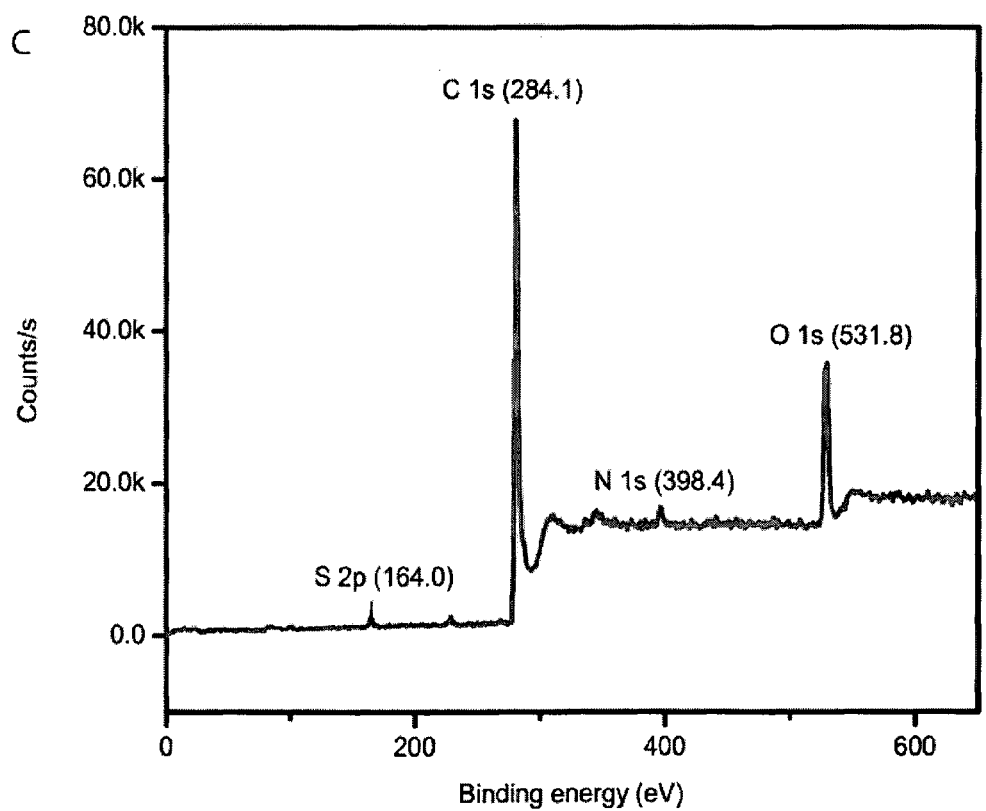

X-ray photoelectron spectroscopy (XPS) was used to measure the chemical composition of the separated Supt s-SWNTs and Ppt m-SWNTs fractions after standing with I (followed by washing with distilled water). Table 1 shows the estimated atomic concentrations of carbon, oxygen, nitrogen, and sulfur in i) pristine nanotubes, ii) and iii) separated tubes, and iv) I. The corresponding high and low resolution spectra are shown in, respectively, FIG. 6 and in FIG. 12.

TABLE 1

Atomic concentrations of oxygen, nitrogen, carbon and sulfur in (i) P2-SWNTs, (ii) Supt-SWNTs, (iii)Ppt-SWNTs, and (iv) I.

| Sample | C1s position (eV) | C1s (%) | O1s (%) (531.8 eV) | N1s (%) (398.4 eV) | S2p (%) (164.0 eV) |
|---|---|---|---|---|---|
| i) Pristine-P2-SWNT | 284.6 | 97.68 | 2.32 | — | — |
| ii) Supt-SWNTs | 283.8 | 90.75 | 7.57 | 0.99 | 0.69 (1.32)† |
| iii) Ppt-SWNTs | 284.1 | 87.08 | 10.3 | 2.03 | 0.75 (2.71)† |
| iv) I | | 46.65 | 20.20 | 9.52 | 12.45 |

†calculated S value based on the N value and the ratio of undecomposed I

Separated s-SWNTs and Ppt-SWNTs showed two peaks, not present in pristine nanotubes, centered at 164.0 eV and 398.4 eV which were assigned to S2p and N1s, respectively (FIG. 12); these arose from I/DP-I. The theoretical C, N, O, and S contents of I were 46.65, 9.52, 20.20 and 12.45%. The higher N1s, O1s and S2p contents in Ppt-SWNTs compared with Supt-SWNTs corroborated the hypothesis that the former fraction had more of the DP-I/I that cannot be washed away easily.

Figure 6:
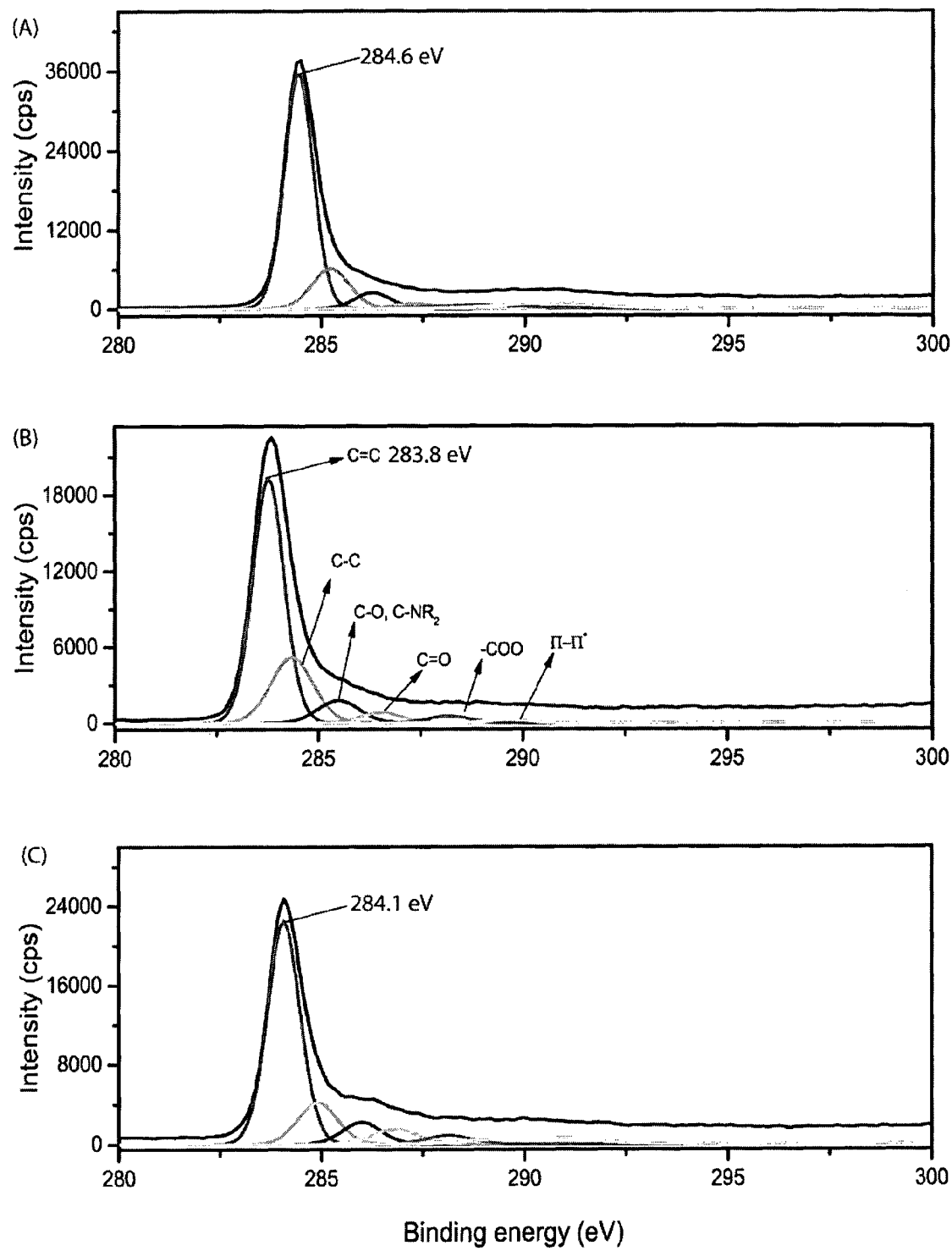
FIG. 6 are graphs showing X-ray photoelectron spectroscopy (XPS) high resolution C1s peak deconvolution of (A) Pristine-P2-SWNTs, (B) Supt-SWNTs, and (C) Ppt-SWNTs and the assigned bonds. (Normalized to Au 4f7 peak at 84.0 eV as internal standards)

FIG. 6 shows the high resolution C1s peak of the three samples (the bond type deconvolutions are listed in Table 2); the peaks in FIG. 6 were normalized to Au 4f7 peak at 84.0 eV as internal standard. There was some downshift in the C1s peak of C=C bond of the Supt-SWNTs and Ppt-SWNTs samples compared with the pristine sample, corroborating the phenomenon of charge transfer between the nanotubes and the undecomposed I. The downshift of the main sp2 peak was more severe in Supt-SWNTs than in Ppt-SWNTs, corroborating that the charge transfer interaction was stronger with Supt-SWNTs than Ppt-SWNTs.

TABLE 2

Atomic concentrations of the various fractions.

| Type | Line | Element | B. E (eV) | Atomic % | FWHM (eV) | Area (CPS) |
|---|---|---|---|---|---|---|
| | C1s1 | C=C | 284.6 | 69.1 | 1.005 | 25380.6 |
| | C1s2 | C—C | 285.8 | 17.6 | 1.595 | 6469.4 |
| | C1s3 | C—O, C—NR2 | 287.0 | 5.69 | 1 | 2094.6 |
| | C1s4 | C=O | 288.1 | 3.11 | 1.095 | 1146.7 |
| | C1s5 | —CO3 | 289.2 | 1.94 | 1.095 | 715.7 |
| | C1s6 | π-π* | 290.4 | 2.55 | 1.905 | 939.5 |
| Supt-SWNT | C1s1 | C=C | 283.8 | 56.88 | 0.881 | 18864.5 |
| | C1s2 | C—C | 284.4 | 20.47 | 1.177 | 6791.5 |
| | C1s3 | C—O, C—NR2 | 285.5 | 7 | 1.177 | 2323.6 |
| | C1s4 | C=O | 286.6 | 3.2 | 1.177 | 1063.8 |
| | C1s5 | —CO3 | 288.2 | 2.13 | 1.177 | 708.4 |
| | C1s6 | π-π* | 289.7 | 1.07 | 1.138 | 357.6 |
| Ppt-SWNT | C1s1 | C=C | 284.1 | 54.34 | 0.917 | 22892 |
| | C1s2 | C—C | 284.9 | 12.2 | 1.11 | 5142 |
| | C1s3 | C—O, C—NR2 | 286.0 | 6.43 | 1.11 | 2713.4 |
| | C1s4 | C=O | 286.8 | 5.24 | 1.315 | 2212.2 |
| | C1s5 | —CO3 | 288.1 | 3.07 | 1.287 | 1297.1 |
| | C1s6 | π-π* | 290.3 | 5.8 | 2.921 | 2455.2 |

Example 12

Matrix-Assisted Laser Desorption/Ionization Coupled with Time of Flight Mass Spectrometry Results (Embodiment 1)

Figure 7:
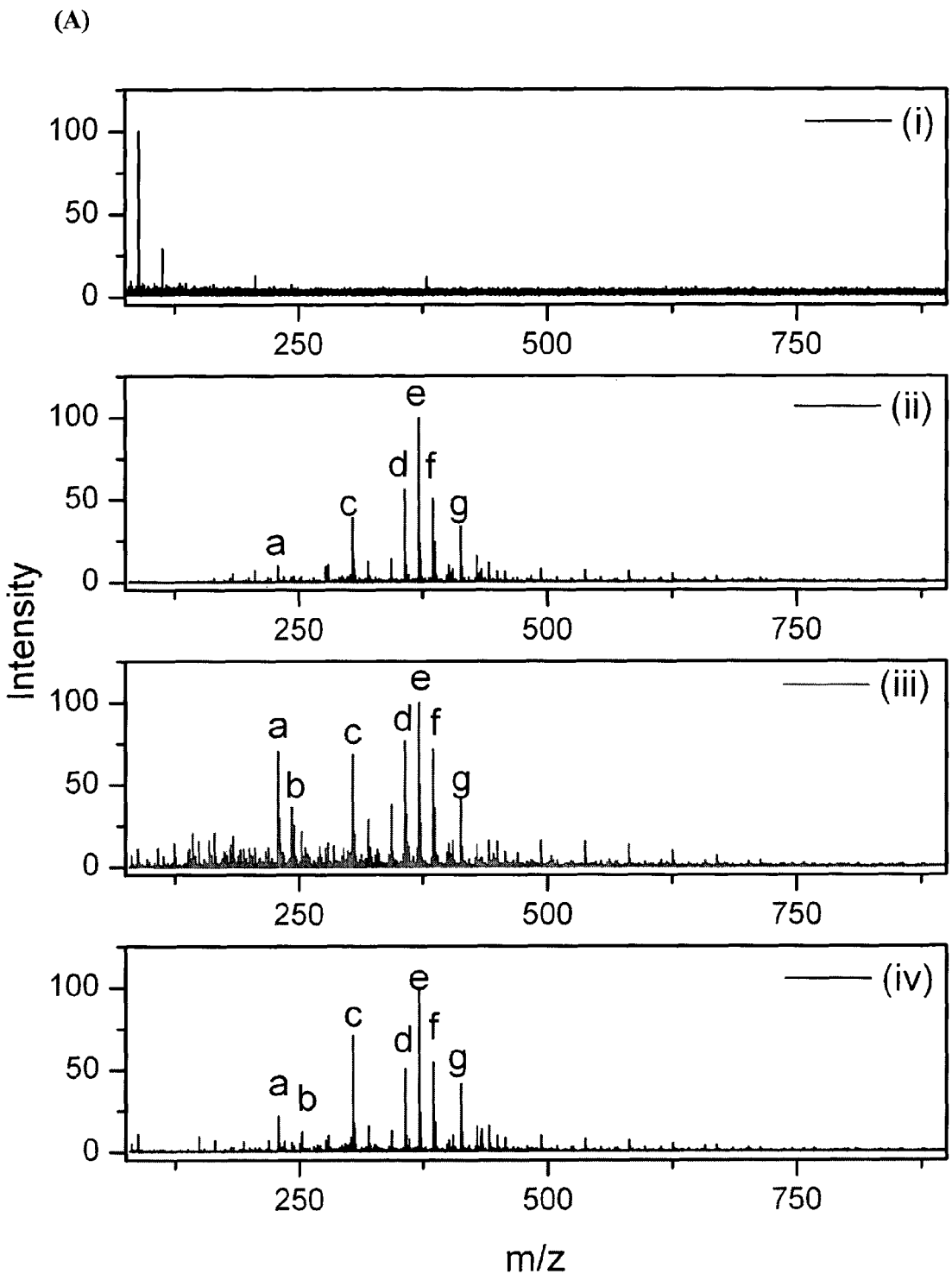
FIG. 7 are graphs showing normalized mass spectra of (i) Pristine P2-SWNT, (ii) Supt SWNTs, (iii) Ppt-SWNTs, and (iv) I, for (A) Low m/z fragments; and (B) High m/z fragments.
Figure 7:
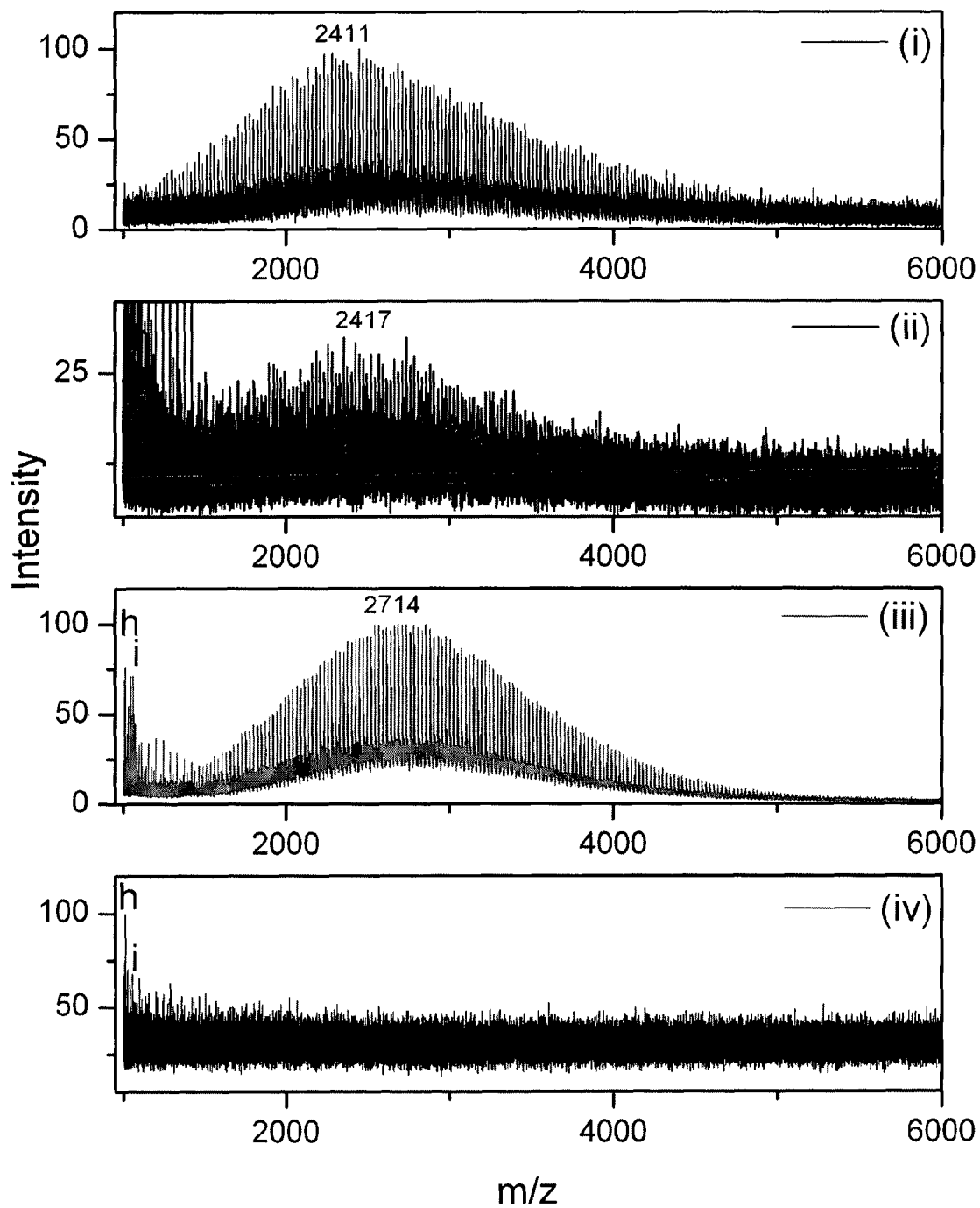
Figure 13:
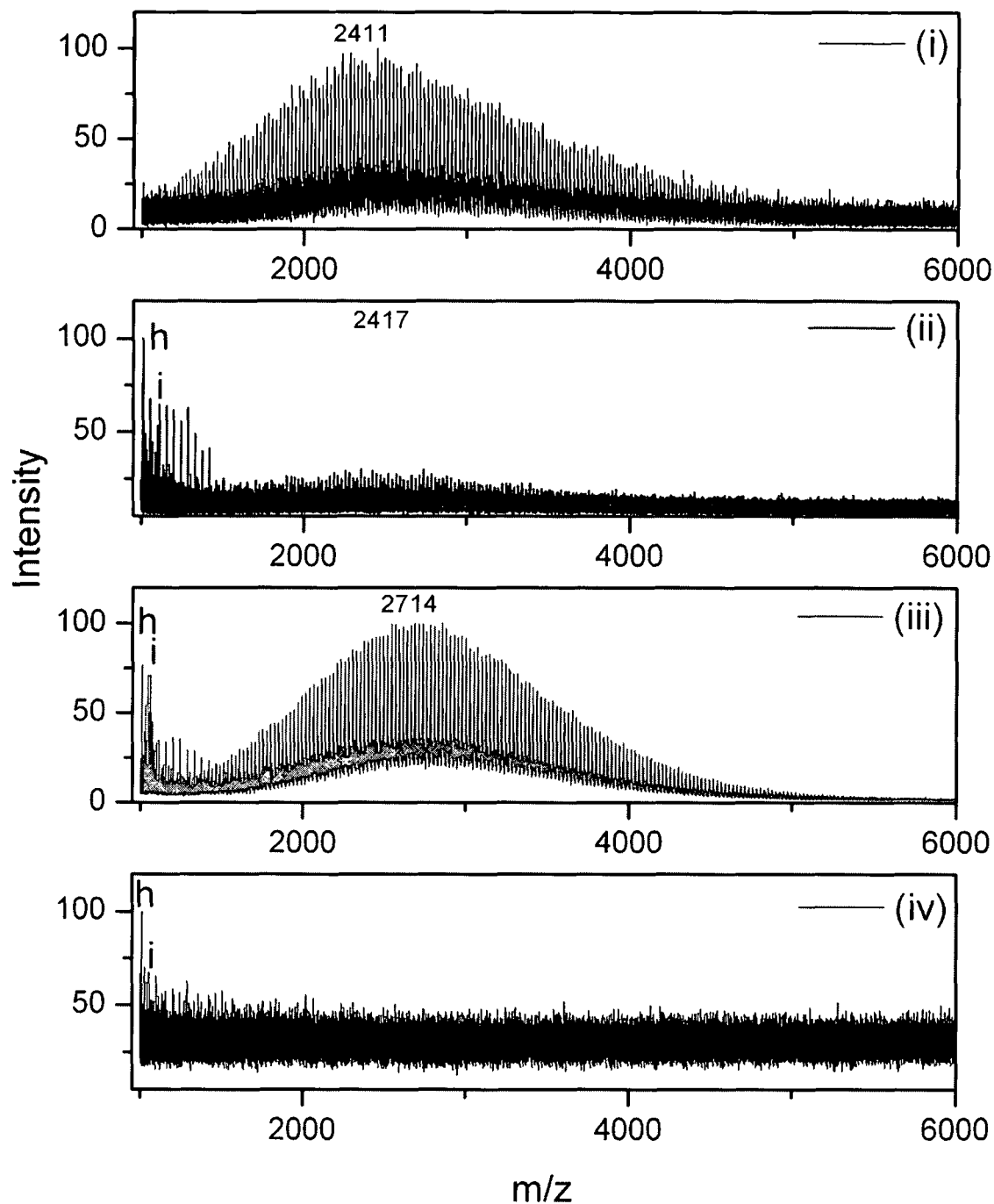
FIG. 13 are graphs showing mass spectra of (i) pristine P2-SWNT, (ii) Supt-SWNT (without enlargement), (iii) Ppt-SWNT and (iv) I.

Matrix-assisted laser desorption/ionization and time of flight mass spectrometry (MALDI-TOF-MS) has become a versatile and important analytical tool for the determination of molecular masses of nonvoltatile samples. Matrix-assisted laser desorption/ionization coupled with time of flight mass spectrometry (MALDI-TOF-MS) was used to help confirm the preferential reaction of decomposed I fragments with m-SWNTs. FIG. 7 (and also FIG. 13 and Table 3) shows the mass to charge (m/z) spectra of (i) pristine-SWNTs, (ii) separated Supt s-SWNTs, (iii) separated Ppt m-SWNTs and (iv) pure –I. FIG. 7A shows the low m/z values corresponding to soluble segments in solution while FIG. 7B shows the mass distribution of the carbon nanotube fragments.

TABLE 3

Degradation products of I identified by MALDI-MS spectra analysis.

| Structure (Fragmentations) | Mass/charge |
|---|---|
| a  naphthalene-1-sulfonate sodium salt | 230.2 |
| b  5-amino-naphthalene-2-sulfonate sodium salt | 245.2 |
| c  1,1′-hydrazonaphthalene (sodium) | 306.3 |
| d  binaphthyl sulfonate sodium salt | 358.4 |
| e  aminonaphthyl-naphthalene sulfonate sodium salt | 371.4 |
| f  1,1′-azonaphthalene sulfonate sodium salt | 384.4 |
| g  hydroxy-sulfo-naphthyl-azo-aminonaphthalene sodium salt | 415.4 |
| h  extended azo/hydrazo naphthalene sulfonate fragment | 1008.9 |

TABLE 3-continued

Degradation products of I identified by MALDI-MS spectra analysis.

| Structure (Fragmentations) | Mass/charge |
|---|---|
| i (naphthyl azo compound structure with $SO_3^-Na^+$, $SO_3^-Na^+$, $N=N$, $N=N$, $N=N$, $O_3^-S\ Na^+$, $SO_3^-Na^+$, $HONa^+$, $NH_2$ groups) | 1052.9 |

Comparison of pristine SWNTs (FIG. 7(A)(i)) and compound I (FIG. 7(A)(iv)) shows many peaks of different intensities due to degraded fragments of I. Table 3 shows the proposed structures of major degradation products (a-i) of I, identified based on the MALDI-MS studies. The SWNTs characterized in FIG. 7(A) (ii) and (iii), and FIG. 7 (B) (ii) and (iii) were washed several times with distilled water. Fragmentation peaks of I (a-i, FIG. 7(A)(iv)) were also observed in the mass spectra of Supt-SWNTs and Ppt-SWNTs (FIG. 7(A)(ii) and (iii)) respectively).

It appears that the relative intensities of the two smaller fragments (a-b), which each contain a single naphthyl ring, were significantly suppressed in Supt-SWNTs (ii) but considerably enhanced in Ppt-SWNTs (iii) while the larger fragments (particularly, c-g) which contained two naphthyl rings each, had approximately the same relative intensity distribution in Supt-SWNTs, Ppt-SWNTs and I. It was inferred that I decomposed to naphthyl radical which had sufficient reactivity to preferentially attack m-SWNTs over s-SWNTs. This was further corroborated by the mass spectra of the various nanotube fractions in FIG. 7B elaborated below.

P2-SWNTs when ionized produce carbon clusters ($C_n$) of varying sizes (FIG. 7B(i)). Singly charged carbon clusters, $C^+_n$, with m/z peak centered at ~2411 (n=~200), (n=~94-350) were observed for pristine P2-SWNTs. For the Supt s-SWNTs (FIG. 7B(ii)), a mass distribution of carbon clusters with a shape similar to pristine P2-SWNTs was observed with m/z maximum centered at ~2417. In contrast, for Ppt m-SWNTs (FIG. 7B(iii)), the maximum of the ionized carbon clusters population intensity was shifted by m/z of 297 towards a significantly higher m/z value, with a maximum at ~2714. This was possibly due to the attachment of degradation products of I to metallic nanotubes.

Table 3 lists the possible degradation products that could be attached to Ppt m-SWNTs and the main degradation products with m/z of around 297 which were identified as naphthyl-based compounds with amine and sulfonic groups. The significant shift in the carbon clusters maximum peak position to ~2714 (m/z) (FIG. 7B(iii)), together with the observed increased a and b peak intensities in the lower m/z fragment range (FIG. 7A(iii)) in Ppt-SWNTs but not in Supt-SWNTs, corroborated the hypothesis that degradation of I to smaller fragments (I-DP, I degradation products) occurred during the standing process, and that these preferentially reacted with m-SWNTs.

Example 13

Density Functional Calculation Results
(Embodiment 1)

Density functional calculations were performed to model the interaction of 2-naphthyl radical with various semiconducting (specifically (12,8) and (19,0)) and metallic ((15,3) and (18,0)) SWNTs. The calculated binding energies of 2-naphthyl radical to SWNTs are listed in Table 4.

TABLE 4

Binding energies of 2-naphthyl radical with SWNTs.

| | Type | Diameter (Å) | Binding energy (eV) 2-Naphthyl radical |
|---|---|---|---|
| SWNT (12,8) | sc | 13.73 | −0.776 |
| SWNT (19,0) | sc | 14.87 | −0.786 |
| SWNT (15,3) | m | 13.14 | −1.064 |
| SWNT (18,0) | m | 14.11 | −1.074 |

Figure 8:
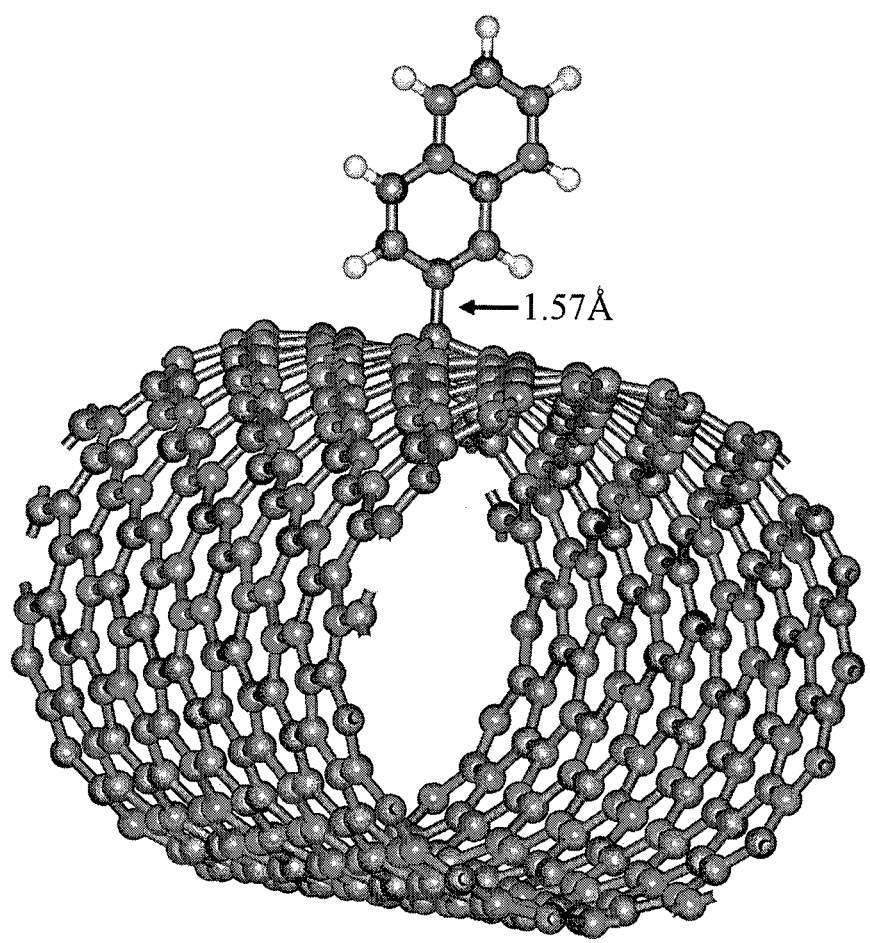
FIG. 8 is an optimized complex structure of 2-naphthyl radical and m-SWNT (15,3). In the figure, gray sphere denotes C atom and white sphere denotes H atom.

It was found that the 2-naphthyl radical bound with the semiconducting and metallic SWNTs studied with binding energies of about −0.78 and −1.07 eV respectively, with the formation of a C═C bond of about ~1.57 Å length (FIG. 8). The higher binding energies, by about 0.3 eV, of 2-naphthyl radical to metallic SWNTs, i.e. (15,3) and (18,0), indicated that the 2-naphthyl radical preferred to bind to the metallic SWNTs rather than to the semiconducting SWNTs studied. The binding energies of 2-naphthyl radical were essentially the same (differences of only 0.01 eV) for each type of SWNTs (semiconducting/metallic) indicating that binding energy was only weakly dependent on the SWNT diameter in the diameter range investigated.

Various techniques described above confirmed preferential solvation of s-SWNTs by undecomposed I and preferential reaction of I-DP with m-SWNTs. It was shown for the first time that sulfonate functionalized naphthalene azo dye is highly metallicity-based selective. Azo compounds have hitherto not been used in the separation of nanotubes. In particular, naphthalene azo compounds are rather stable, although long term standing, heat and/or sonication may slowly decompose them. Azo bonds are rather unstable compared to $N_2$, and they form radicals during the decomposition. The low concentration of the naphthyl radical formed by the breaking of azo bonds at prolonged standing at room temperature results in less aggressive and more metallicity selective attack of SWNT sidewalls than benzene azo radical since the naphthalene ring stabilizes it.

Without wishing to be bound by any theory, it is postulated that the separated Ppt m-SWNTs are preferentially reacted with DPs of I via a radical reaction. In contrast to Strano's diazonium-based chemistry, the aryl radical is uniquely stabilized by the naphthyl group rather than the phenyl group. The naphthyl radical produced is reactive to m-SWNTs but comparatively less reactive than the benzene diazonium intermediate generated from Strano's compounds because of the resonance stabilization afforded with the naphthalene group. (The stabilities of various aryl diazonium compounds measured by their reduction potentials are summarized in Table 5).

TABLE 5

Reduction potentials of azo compounds.

| S No. | Aromatic azo compounds[a-g] | Reduction potential (V) |
|---|---|---|
| 1 | 3-(4-dimethylamino-phenylazo)-benzene sulfonic acid sodium salt | −0.191 |
| 2 | 4-[[4-(dimethylamino)phenyl]azo]benzene sulfonic acid sodium salt | −0.131 |
| 3 | 3-(2-hydroxy-naphthalen-1-phenylazo)-benzene sulfonic acid sodium salt | −0.315 |
| 4 | 4-[(2-hydroxy-1-naphthyl)azo] benzene sulfonic acid, monosodium salt | −0.354 |
| 5 | Trisodium 3-hydroxy-4-(4-sulfonato-1-naphthylazo)-2,7-naphthalenedisulfonate | −0.270 |

TABLE 5-continued

Reduction potentials of azo compounds.

| S No. | Aromatic azo compounds[a-g] | Reduction potential (V) |
|---|---|---|
| 6 | (structure shown) | −0.408 |

(I) 1,5-Naphthalenedisulfonic acid, 3-[[4-[[4-[(6-amino-1-hydroxy-3-sulfo-2-naphthalenyl)azo]-6-sulfo-1-naphthalenyl]azo]-1-naphthalenyl]azo]-, tetrasodium salt

| 7 | (structure shown) | −0.478 |

Tetrasodium 4-amino-5-hydroxy-3,6-bis[[4-[[2-(sulphonatooxy)ethyl]sulphonyl]phenyl]azo]naphthalene-2,7-disulphonate Furthermore, the undecomposed azo dye used is itself a dispersant which is also selective, but to the other species (semiconducting), so that it preferentially suspends s-SWNTs while its decomposition products selectively react with m-SWNTs, resulting in the settling, under centrifugation, of a higher proportion of the m-SWNTs than of the s-SWNTs. It appears that the presence of highly solvating and electron-withdrawing sulfonate groups makes I a s-SWNT selective as well as a good dispersant. The stability of I permits it to selectively disperse/suspend s-SWNTs during the long standing period.

Example 14

Separation of SWNTs (Embodiment 2)

Solution processing of pristine P2-SWNTs was carried out in the following manner.

Arc-discharge P2-SWNTs were dispersed in a $1 \times 10^{-5}$ M solution of I in water and the mixture was sonicated at ice water bath for 1 h, followed by ultrasonication by immersing an ultrasonic probe into the P2-SWNT solution with I. The mixture of P2-SWNT/I solution was placed in a bath of ice-water during ultrasonication to avoid heating. After ultrasonication, the resulting mixture was kept standing for five days at room temperature.

The solution was centrifuged at 50,000 g with a fixed angle rotor for 1 hr, by which the insoluble materials were settled down. The top fraction (60%) was collected after centrifugation, and the solution was filtered through polycarbonate membrane having a pore size of 0.2 µm. Washing process was repeated several times using distilled water. This procedure also allowed the physically adsorbed I molecules to be removed from the SWNTs.

The separated supenatant-SWNTs (Supt-SWNT) and precipitated-SWNTs (Ppt-SWNT) were collected, and washed with doubly distilled water to remove un-reacted I molecules from the SWNTs. As in the case for Embodiment 1, the separated Supt-SWNT and Ppt-SWNT were re-dispersed in 1% sodium dodecyl sulphate (SDS) and sodium cholate (SC) co-surfactant solution (1:4 SDS/SC) by ultrasonicating for 30 min (FIG. 2).

Example 15

Characterization of SWNTs (Embodiment 2)

UV-VIS-NIR absorption spectra, Raman spectra, AFM, XPS measurements and electrical properties measurements on FETs were measured using the same procedure as that used for Embodiment 1 as described above.

Electrochemical experiments were performed with a CH Instruments (Chi611d, TX, USA). All electrochemical experiments were carried out with a conventional three-electrode system. GCE (the geometric diameter was 3 mm) was used as the working electrode. Platinum wire and Ag/AgCl (3M KCl) electrode were used as the counter electrode and the reference electrode, respectively. The electrolyte solution was purged with high-purity argon gas for at least 10 min prior to each electrochemical experiment.

Example 16

Raman Spectroscopy Results (Embodiment 2)

Figure 14:
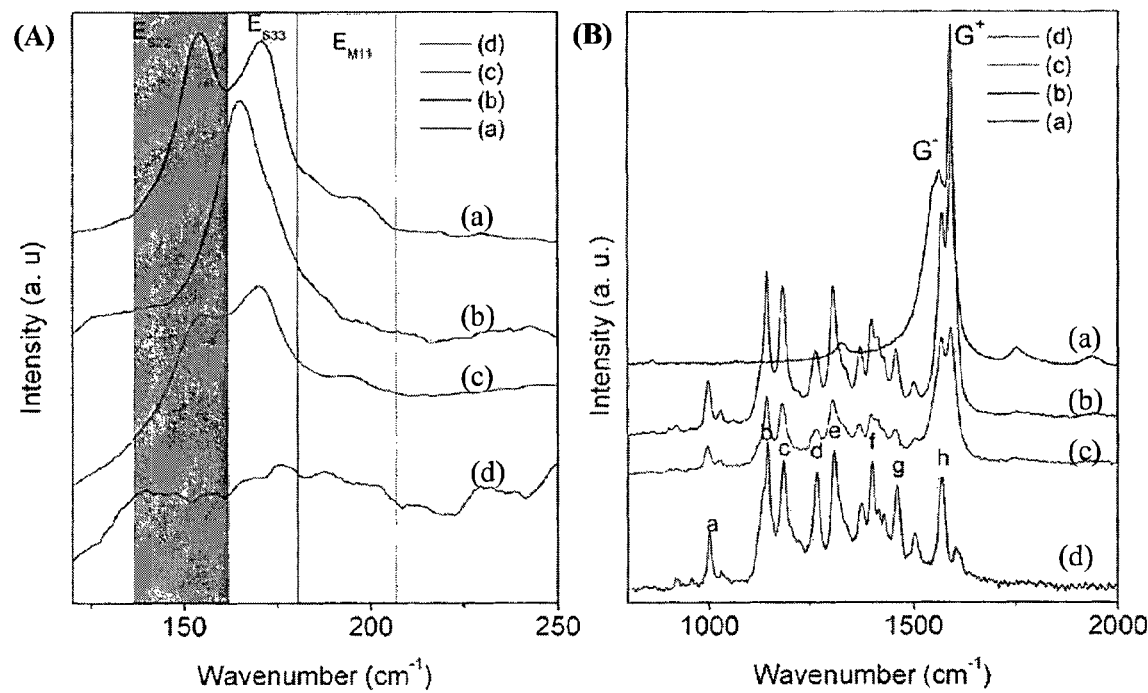
FIGS. 14(A) and (B) are graphs showing Raman spectra of (a) pristine-P2-SWNT, (b) separated s-SWNT, (c) m-SWNT and (d) I.

FIG. 14 displays the Raman spectra in the radial breathing mode (RBM) range of pristine and of separated Supt-SWNT and Ppt-SWNT samples. Lower frequency RBMs (130-160 cm⁻) (diameter was calculated to be about 1.54 nm of semiconducting (20, 0) zigzag tube, a (12, 11) tube or (16, 6) chiral tubes) were attributed to semiconducting tubes, and higher frequency RBMs (160-240 cm$^{-1}$) were due to metallic nanotubes (average diameter was 1.32-nm of metallic, possibly a (16, 1) or a (15, 3) chiral tube). Compared to pristine nanotubes, higher frequency RBMs of metallic tubes eventually vanished in separated Supt-SWNT (FIG. 14A, curve (b)). It is very clear that metallic fraction was removed in s-SWNT solution. However, in vis-NIR spectra of Ppt-SWNT, metallic tubes were observed, which indicated that metallic-SWNTs were associated with Ppt-SWNTs (FIG. 15, curve (c)).

In Raman spectra, the frequency range between 1450 and 1700 cm$^{-1}$ known as the tangential modes (TM) were featured by the G⁺ and G⁻ modes. The G⁻ mode was broad and asymmetrical on the low energy side with a Breit Wigner Fano profile. This was interpreted by a phonon plasmon coupling with a continuum of states as due to the metallic nature of the tubes. The spectra were normalized with respect to the area of the G modes. The G⁻ band areas (1591 cm$^{-1}$) in FIG. 14B curve (b) was smaller when compared with the spectra in FIG. 14B curve (a). From quantitative analysis presented here, it may be seen that the Raman spectroscopic properties of the G band was significantly altered after separation by using I. In particular, G⁻ intensity (1563 cm$^{-1}$) was decreased from P2-SWNT, and became very low in Supt-SWNT suspension. Such a variation was most likely to be related to the successful removal process of metallic tubes, from which Supt-SWNT was found to possess the highest content of semiconducting tubes.

In addition, Raman spectra of metallic portion of the separated-SWNTs revealed that the area G⁻ band was most likely similar with pristine tubes (FIG. 14B, curve (c)) and G⁺ band intensity also decreased, which was a unique behavior of metallic tubes. Raman spectra of I was investigated, and several characteristic peaks at 999, 1144, 1181, 1266, 1306, 1398, 1457, and 1571 cm$^{-1}$ denoted a to h in the figure were observed (FIG. 14B, curve (d)). These peaks probably derived from the vibrational modes of the azo dye in the substrate. All of these characteristic vibrational peaks were observed in separated s-SWNT and m-SWNTs (FIG. 14B, curves (b) and (c)).

Example 17

Visible Near-Infrared (vis-NIR) Results
(Embodiment 2)

Figure 15:
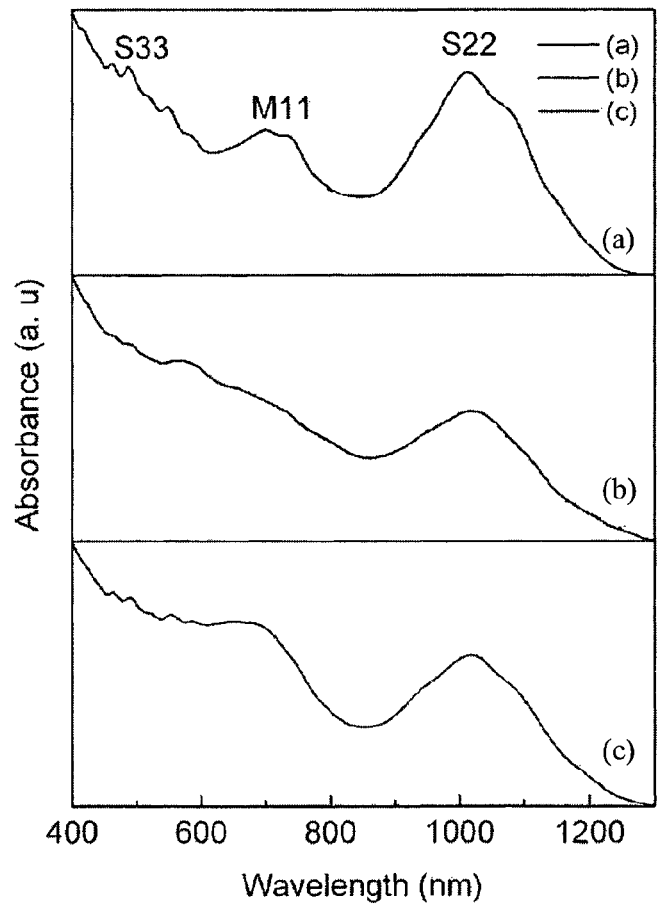
FIG. 15 are graphs showing UV-vis-NIR spectra of (a) pristine (P2-SWCNT), (b) separated s-SWNTs, and (c) separated m-SWNTs.

FIG. 15 shows the vis-NIR absorption spectra of Pristine P2-SWNTs, separated s-SWNT and m-SWNTs (m-SWNTs) (dispersed in a co-surfactant 1% SDS/SC solution). Three regions were identified in the spectra of P2-SWNT which were first interband transitions for metallic tubes, $M_{11}$ (719 nm), and third and second interband transitions for semiconducting tubes, $S_{33}$ (460-488 nm) and $S_{22}$ (920-1120 nm) (FIG. 15, curve (a)).

In FIG. 15, curve (b) spectra corresponding to metallic bands (M11) were suppressed in the separated SWNT suspension (s-SWNT), which indicated that metallic SWNTs were discriminated. Further, precipitated-SWNTs were collected, and vis-NIR spectra measured as shown in FIG. 15 curve (c), in which $M_{11}$ metallic bands were dominating the spectra.

It was reported that, the second semiconducting interband transition ($S_{22}$) in vis-NIR spectra, could be used for purity evaluation because it was less affected by doping during chemical purification than the first interband transitions ($S_{33}$). Purity of the separated Supt-SWNT was examined by using the ratio of $A_S/A_M+A_D$, where $A_S$ is the area of the $S_{22}$ absorption peak area after baseline subtraction, and $A_M$ is the area of the Mil absorption peak area after baseline correction. The purity of the separated s-SWNT suspension was evaluated using above procedure.

In the separated Sept-SWNT suspension, the semiconducting SWNT purity was evaluated as 96%. The selective suppression of metallic tube absorption bands, and the enhancement of semiconducting absorption bands in terms of purity in s-SWNT suspension demonstrate that this separation method with I was highly effective for discrimination of metallic tubes from semiconducting-SWNTs based on their electronic properties. To calculate the yield of the semiconducting-SWNT separation, the separation procedure was repeated. Then, based on the measured weight after the separation, the yield of the semiconducting tubes was estimated to be 42.04%.

Example 18

X-Ray Photoelectron Spectroscopy (XPS) Results
(Embodiment 2)

To ascertain the preferential reaction of I with m-SWNTs, X-ray photoelectron spectroscopy (XPS) was used to provide information about the chemical composition and bonding of the separated s-SWNTs/I and m-SWNTs/I. Table 6 shows the estimated atomic concentration of carbon, oxygen, nitrogen, and sulfur in the starting materials, and in the separated tubes. The different binding energy peaks were assigned to C—C at 284.93 eV, C—O at 286.02 eV, C—NR2 at 286.83 eV, 0-C=O at 288.14 eV and π-π* at 290.26 eV.

TABLE 6

Atomic concentration of oxygen, nitrogen, carbon and sulfur in P2-SWNT, Supt-SWNT and Ppt-SWNT.

| Sample | O1s (531.8 eV) | N1s (398.4 eV) | C1s (285.0 eV) | S2p (164.0 eV) |
|---|---|---|---|---|
| a) Ppt-SWNT | 10.3 | 2.03 | 87.08 | 0.75 |
| b) Supt-SWNT | 7.57 | 0.99 | 90.75 | 0.69 |
| c) Pristine-P2-SWNT | 2.32 | — | 97.68 | — |

Figure 20:
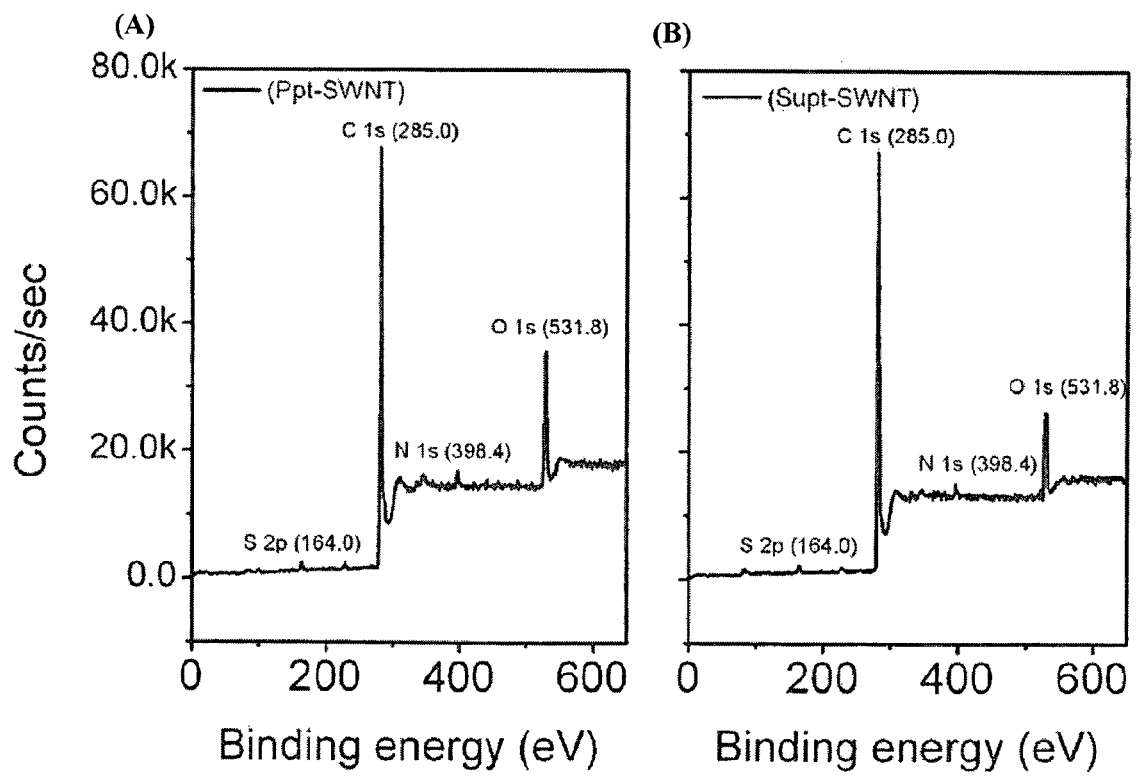
FIG. 20 are graphs showing X-ray photoelectron spectra of (A) separated Ppt-SWNT film; (B) separated Supt-SWNT film, and (C) P2-SWNT film.
Figure 20:
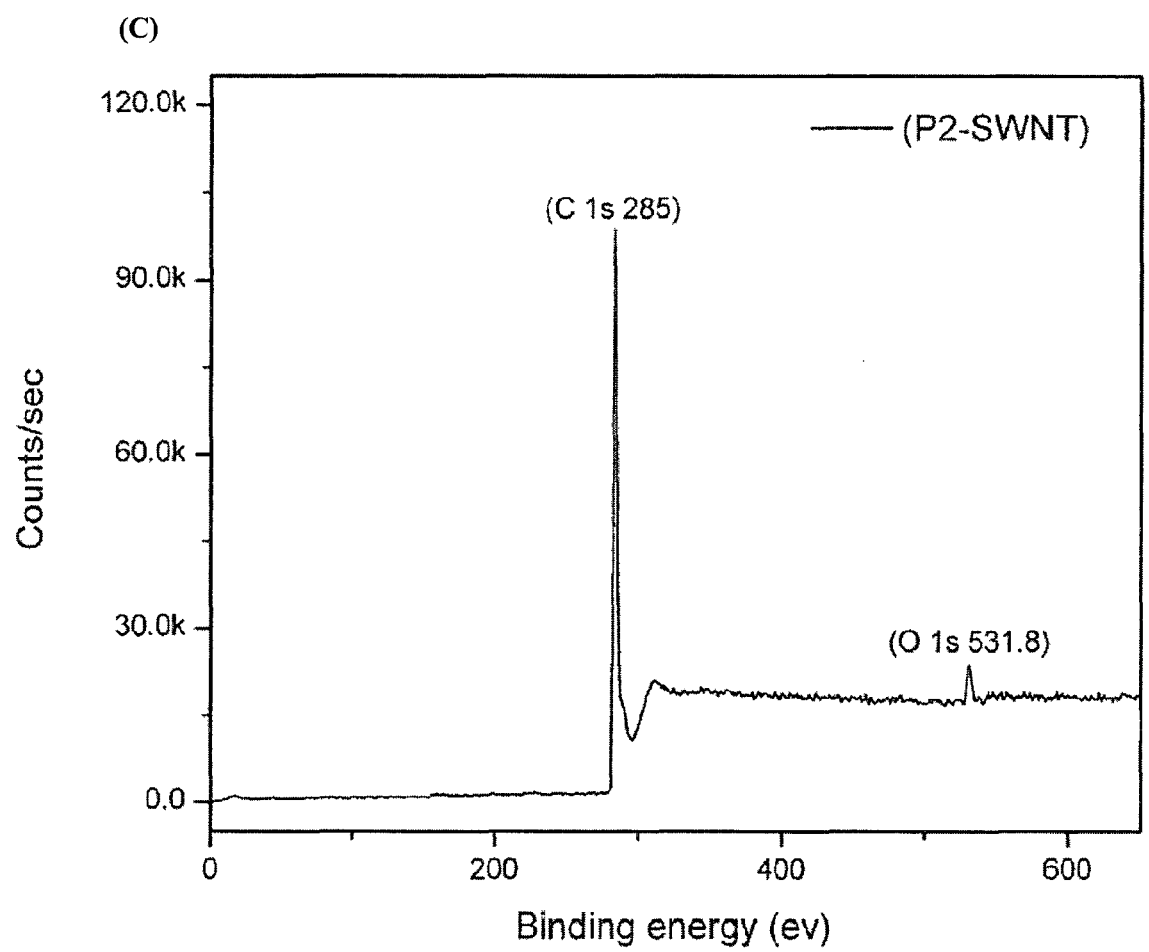
Figure 21:
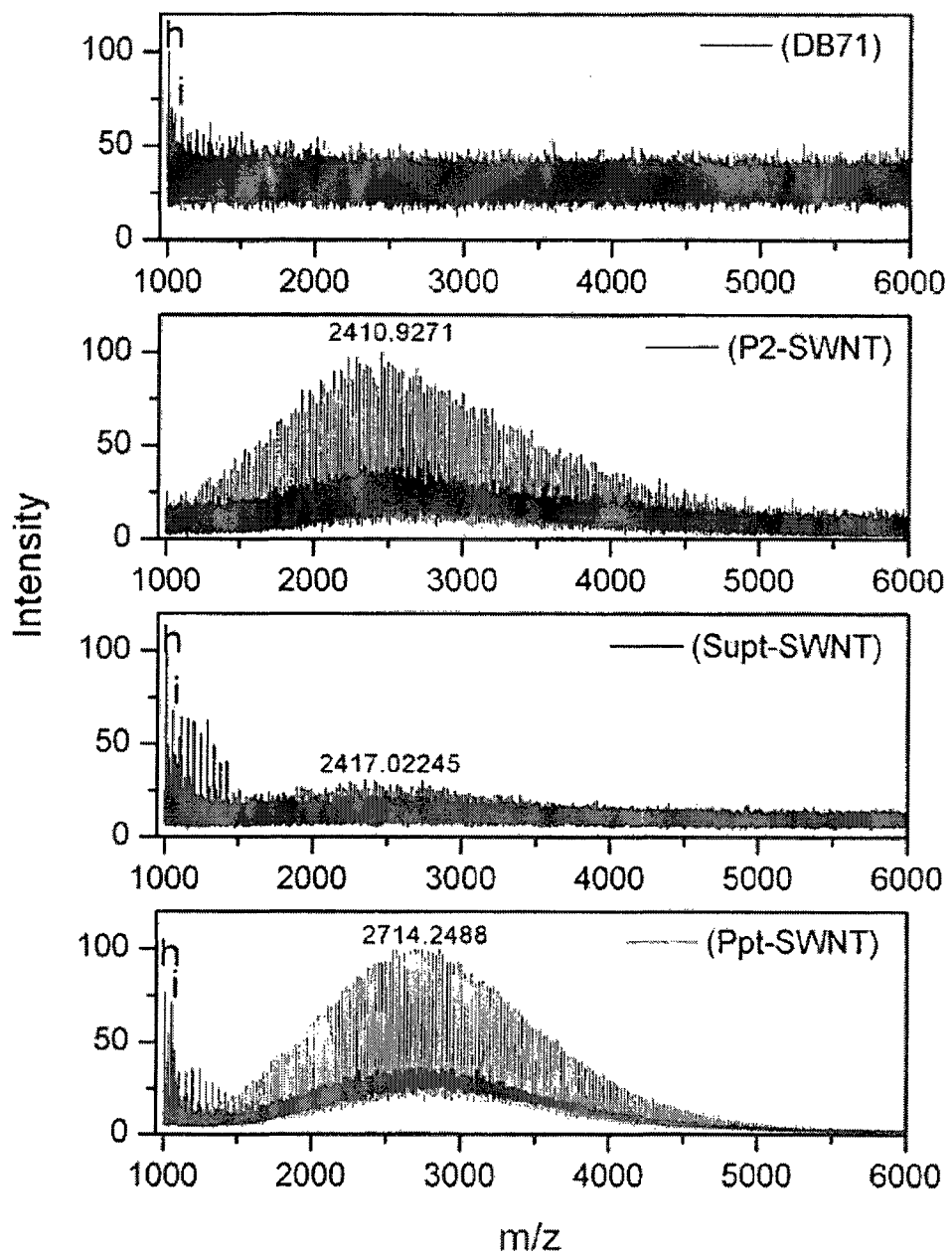
FIG. 21 are graphs showing mass spectra of I, P2-SWNT, Supt-SWNT (without enlargement) and Ppt-SWNTs.

Observation was made that the separated-s-SWNT showed two separate peaks centered at 164.0 and 398.4 eV. The peak at 164.0 and 398.4 eV were assigned to a reduced form of sulfur, and nitrogen (N1s), respectively. For the precipitated m-SWNTs, the nitrogen percentage was 2.03% and the oxygen percentage was 10.30%, which were higher than in Supt-SWNTs (supernatant, N=0.99% and O=7.57%). These differences seemed to suggest that the m-SWNTs were preferentially reacted with I which could affect the atomic percent of the detected elements (FIG. 20).

Example 19

Matrix-Assisted Laser Desorption/Ionization and
Time of Flight Mass Spectrometry
(MALDI-TOF-MS) Results (Embodiment 2)

Figure 16:
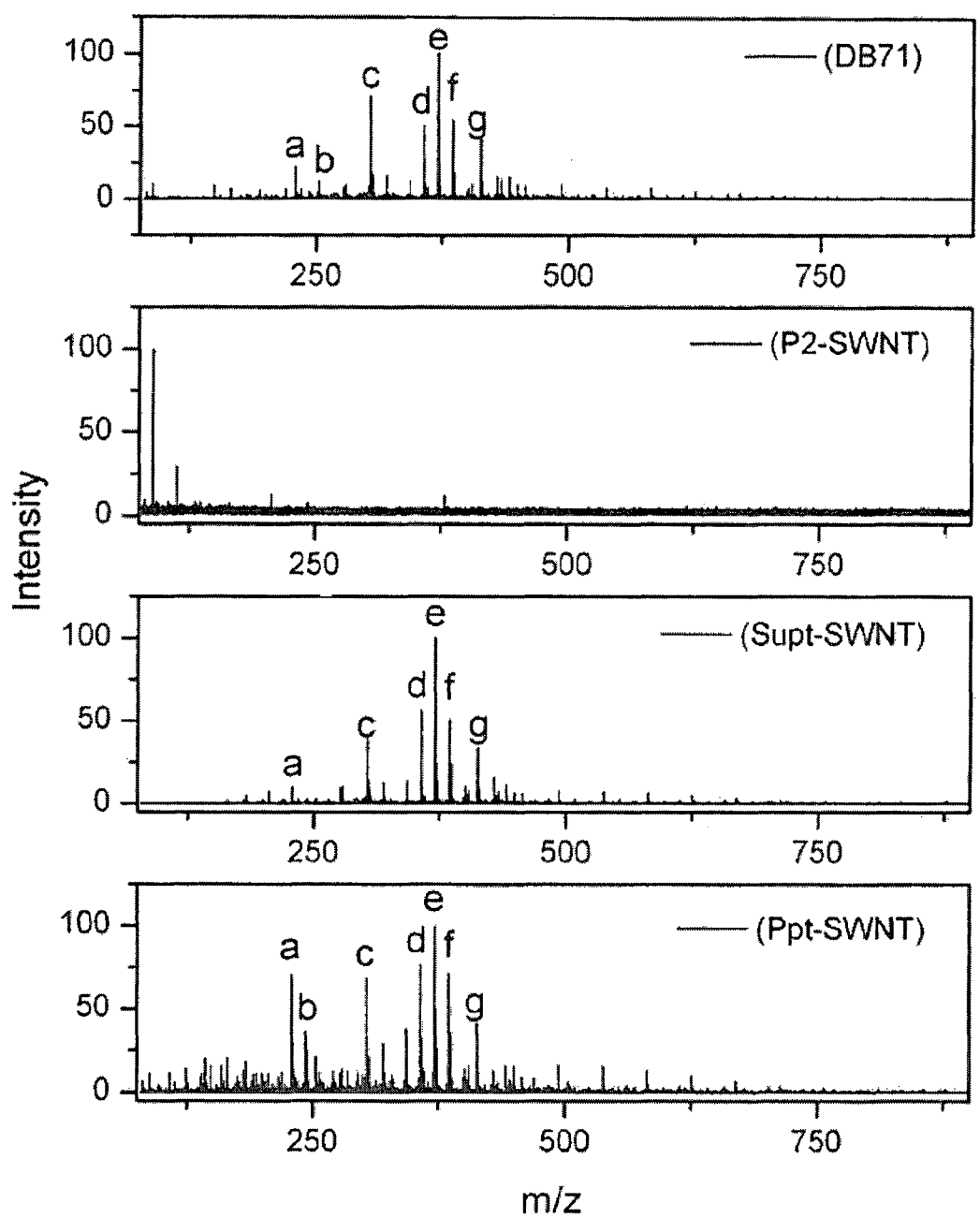
FIG. 16 are graphs showing mass spectra of I, P2-SWNT, Supt-SWNT and Ppt-SWNTs for low m/z fragments.
Figure 17:
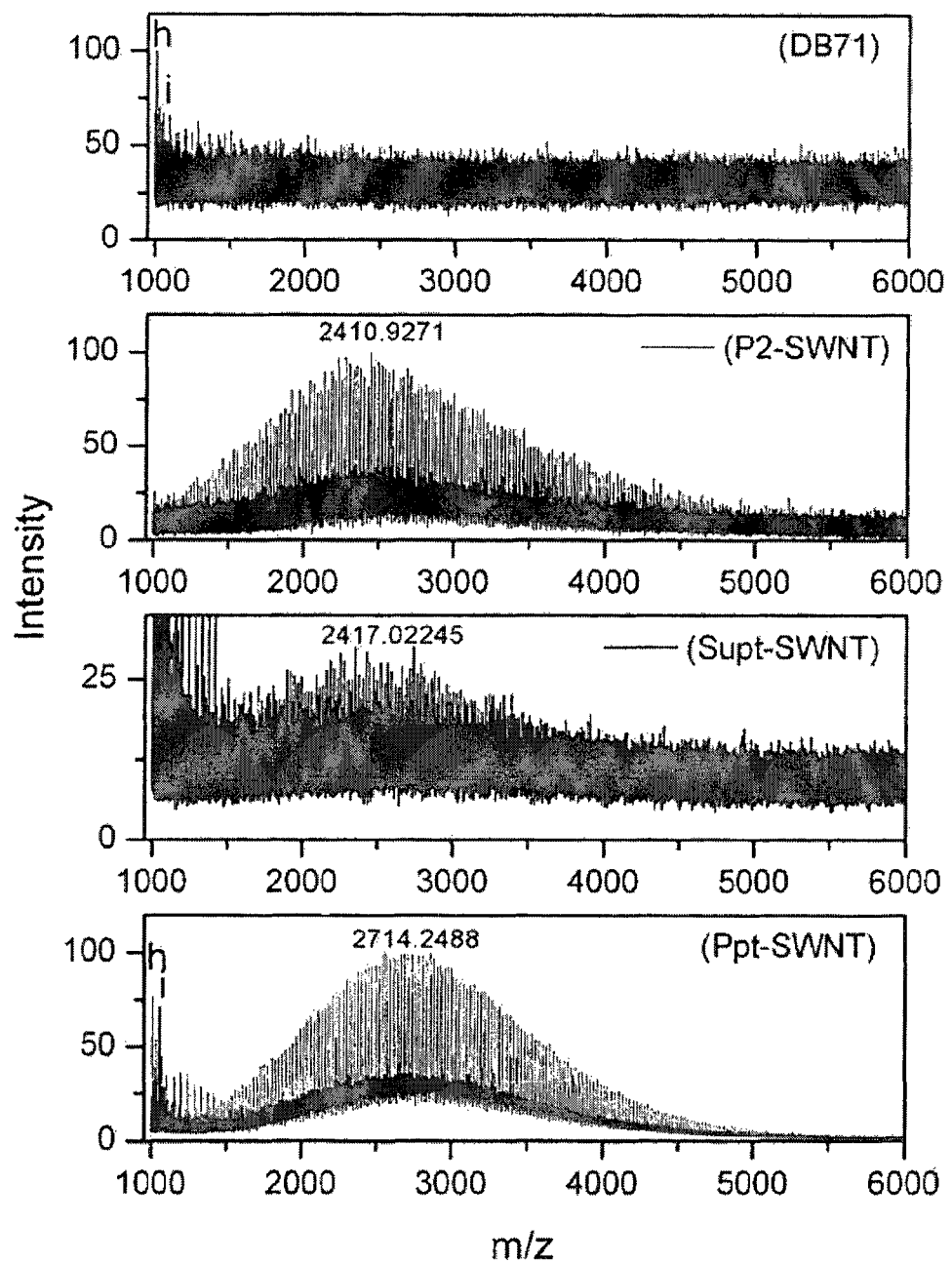
FIG. 17 are graphs showing mass spectra of I, P2-SWNT, Supt-SWNT and Ppt-SWNTs for high m/z fragments.

FIGS. 16 and 17 show the mass spectra of pure-I, pristine-SWNTs, and separated semi- and metallic-SWNT, respectively. Many peaks of different intensities were observed in the MALDI-MS spectra of I due to the degradation products. Table 2 shows the proposed structures of major degradation products (a-i) of I, which were identified based on the MALDI-MS studies. P2-SWNT gave specific mass spectrum of carbon clusters $C_n$ as well as their size (FIGS. 16 and 17). The formation of singly charged carbon clusters, $C^+_n$, with groups of carbon clusters centered at n=200 (m/z maxima at ~2410.9271), n~94-350 were observed.

As shown in FIGS. 16 and 17, fragmentation peaks of I (a-i) were also observed in the mass spectra of Supt-SWNT, and Ppt-SWNT. Compared to MALDI-TOF-MS of P2-SW-CNT, the maximum of ionization of carbon clusters peak was shifted towards the higher m/z values (maxima at ~2714.2488) for Ppt-SWNT. In contrast to Ppt-SWNT, a very similar mass distribution of carbon clusters was observed for Supt-SWNT (m/z ~2417.02245). It was suggested that this may be due to the attachment of fragmentation products of I with the metallic tubes. As evidenced by MALDI-TOF-MS analysis, degradation of I occurred during the separation process, and main components were identified by their mass/charge ratio (Table 3). Major degradation products such as biphenyls with amine and sulfonic groups were attached with metallic tubes SWNTs, which shifted the carbon clusters peak position to ~2714.2488 (m/z), probably due to an irreversible adsorption of the intermediates and/or products of reaction to the metallic tubes.

Example 20

Electrochemical Measurements (Embodiment 2)

The mechanism of separation may also be explained by examining electrostatics of the pure metallic-SWNT (M-SWNT) (98%, Purchased from Nanointegris, Skokie, Ill.) and pure semiconducting SWNTs (S-SWNT) (98%, Purchased from Nanointegris, Skokie, Ill.) and their interaction with I molecules in an aqueous solution. To ascertain the nature of binding, 10 µL of each M-SWNTs, and S-SWNTs dispersions were drop casted onto the individual well cleaned glassy carbon (GC) electrodes (area=0.0707 cm$^2$) and kept standing at 60° C. for 30 min. The interactions of the M-SWNT/GC and S-SWNT/GC with I were examined by immersing in 0.1 m NaCl containing 0.1 mM I for 30 min at room temperature. Interaction of I with the SWNTs depends on their electronic charge density of the individual tubes.

Figure 18:
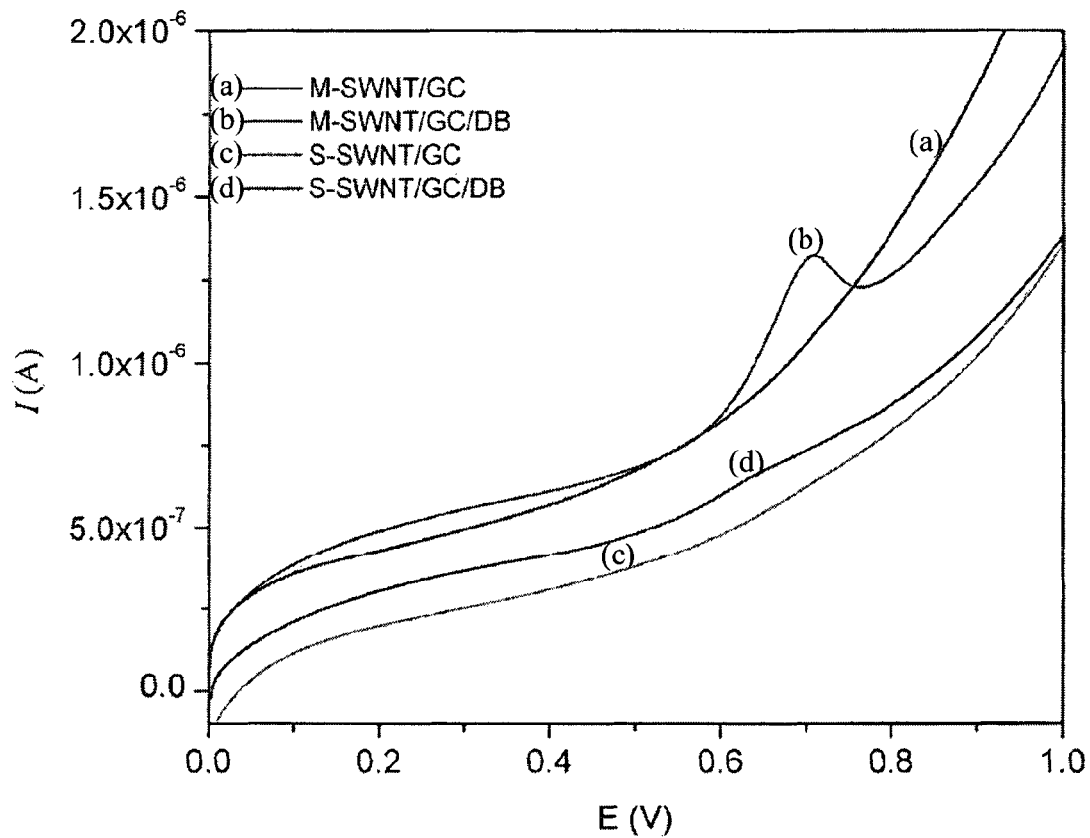
FIG. 18 is a graph showing linear sweep voltammograms (LSV) of (a) M-SWNT/GC; and (c) S-SWNT/GC in sodium chloride (NaCl) solution (a, c) before and (b, d) after immersion in I solution.

It was reported that metallic SWNTs are more strongly adsorbed by amines than semiconducting SWNTs, and the adsorbed amines are removable after separation. In the study performed, after immersion process, M-SWNT/GC and S-SWNT/GC electrodes were washed using background electrolyte NaCl to remove physically adsorbed I molecules. FIG. 18 shows linear sweep voltammograms (LSV) of the electrodes in 0.1 M NaCl before and after immersion in I solution. From the voltammograms, it may be seen clearly that I molecules strongly interacted with M-SWNT coated GC electrode and a sharp oxidation wave at +0.7 V was observed. In contrast, anodic oxidation peak of I was not as clearly seen on the S-SWNT, which showed less interaction of I molecules with semiconducting tubes due to lack of electron density. This overall observation may invoke a less efficient reaction of I toward semiconducting tubes.

Figure 22:
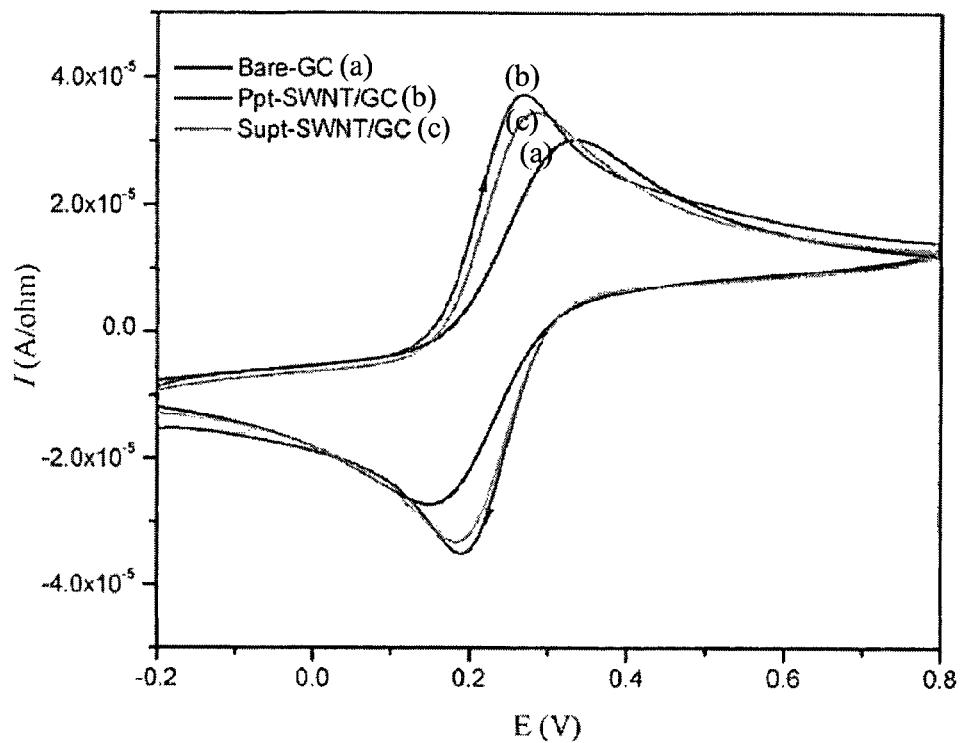
FIG. 22 are graphs showing (A) cyclic voltammograms (CVs) of (a) bare-GC, (b) Ppt-SWNT/GC, and (c) Supt-SWNT/GC modified electrodes in 1 mM $[Fe(CN)_6]^{3-/4-}$+ 0.1 M NaCl solution; and (B) LSVs of (b) Ppt-SWNT/GC and (c) Supt-SWNT/GC in 0.1 M NaCl solution. Also, LSVs of (a) bare GC in 1 mM DB solution containing 0.1 M NaCl.
Figure 22:
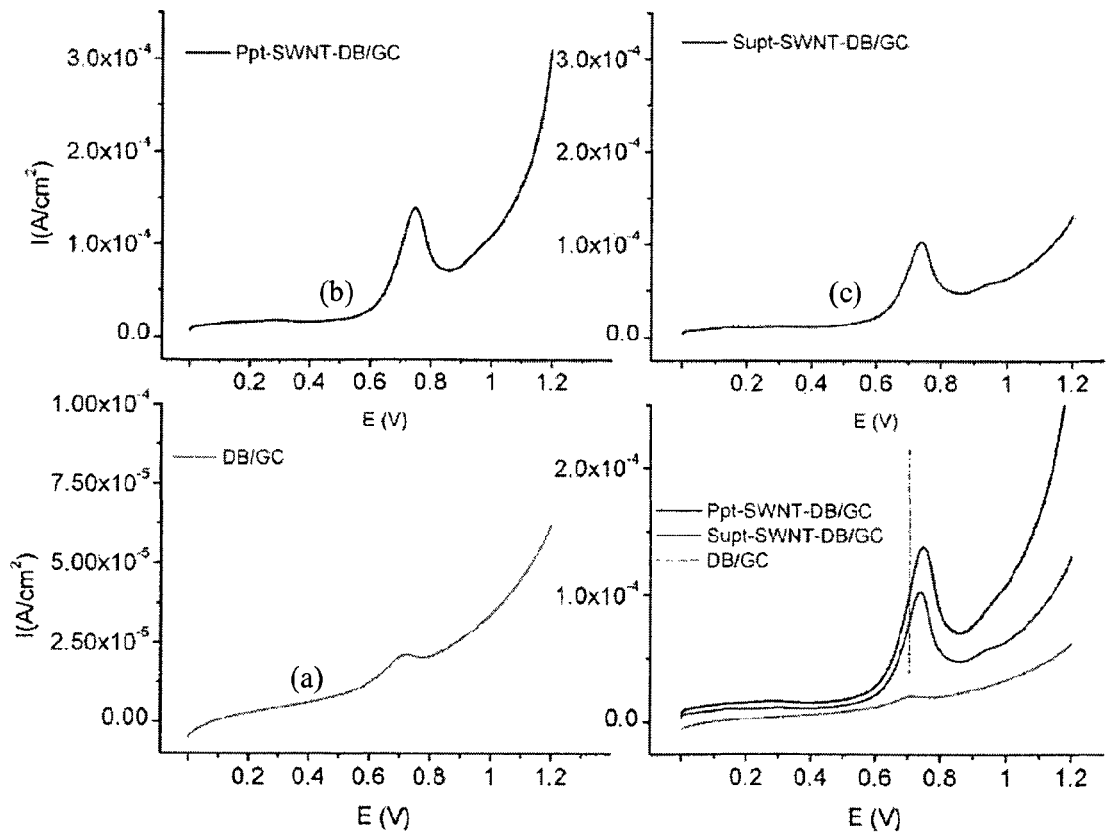

Using electrochemistry as an important tool, electrochemical oxidation of I attached with Supt-SWNT and Ppt-SWNT after separation process, which was a direction indication of presence of amine groups attached with the nanotubes, was studied. As shown in FIG. 22, electrochemical surface area of the GC electrodes were estimated by measuring cyclic voltammograms (CVs) using ferrocyanide+potassium chloride (KCl) solution as a redox probe before and after modification with 10 µL of Supt-SWNT, and Ppt-SWNT solutions. In a separate experiment, GC electrode surface was modified with 10 µL Supt-SWNT solution, and then electrode was dried at 60° C. in an air oven for an hour. Then the electrode was washed with distilled water, and then LSV was recorded in 0.1 M NaCl solution between 0-1.2 V at a scan rate of 50 mVs$^{-1}$. A sharp oxidation wave of Supt-SWNT was observed at 738 mV (vs. Ag/AgCl), which was due to the oxidation of primary amine group of I. In the same way, electrochemical oxidation of separated mSWNT modified GC was studied (FIG. 22B).

$$Fe^{III}(CN)_6^{3-} + e^- \rightarrow Fe^{II}(CN)_6^{4-} \tag{1}$$

According to the Randles-Sevcik equation (1) ( )

$$Ip = 2.69 \times 10^5 n^{3/2} AD^{1/2} v^{1/2} C \tag{2}$$

Where Ip is the peak current (A), n is the number of electronis participaritn in the $[Fe(CN)_6]^{3-/4-}$ redox reaction (n=1), A is the geometric area of the electrode (cm$^2$), D is the diffusion coefficient (cm$^2$s$^{-1}$), C is the redox molecules concentration, and v is the scan rate (V/s).

Since the above CVs were all recorded at the same scan rate and concentration of the solution, the Ip could be determined by the concentration of the redox active species at the electrode surface and may be correlated with the electrochemical surface area of the electrode. Therefore, electrochemical surface area of the electrodes was calculated as given below.

Area of the electrodes are Supt-SWNT-DB/GC=0.0855 cm$^2$, Ppt-SWNT-DB/GC=0.0901 cm$^2$, Bare-GC-DB=0.0707 cm$^2$ It iwas suggested that separated Sept-SWNT, and Ppt-SWNT were all covered with I molecules. The following observation may be derived from FIG. 22, namely (i) increased oxidation current on Ppt SWNT/GC indicated that degradation products of I with primary amine was preferentially attached with metallic tubes rather than semiconducting tubes; (ii) compared to bare-GC, up shift in the oxidation potential ($E_{pa}$) (+32 m V) was observed after reaction with Ppt-SWNT, probably due to an irreversible adsorption of the intermediates and/or products of reaction to the nanotubes. This observation was also supported by UV-vis spectra of I solution before and after interaction with SWNTs as mentioned below.

Figure 23:
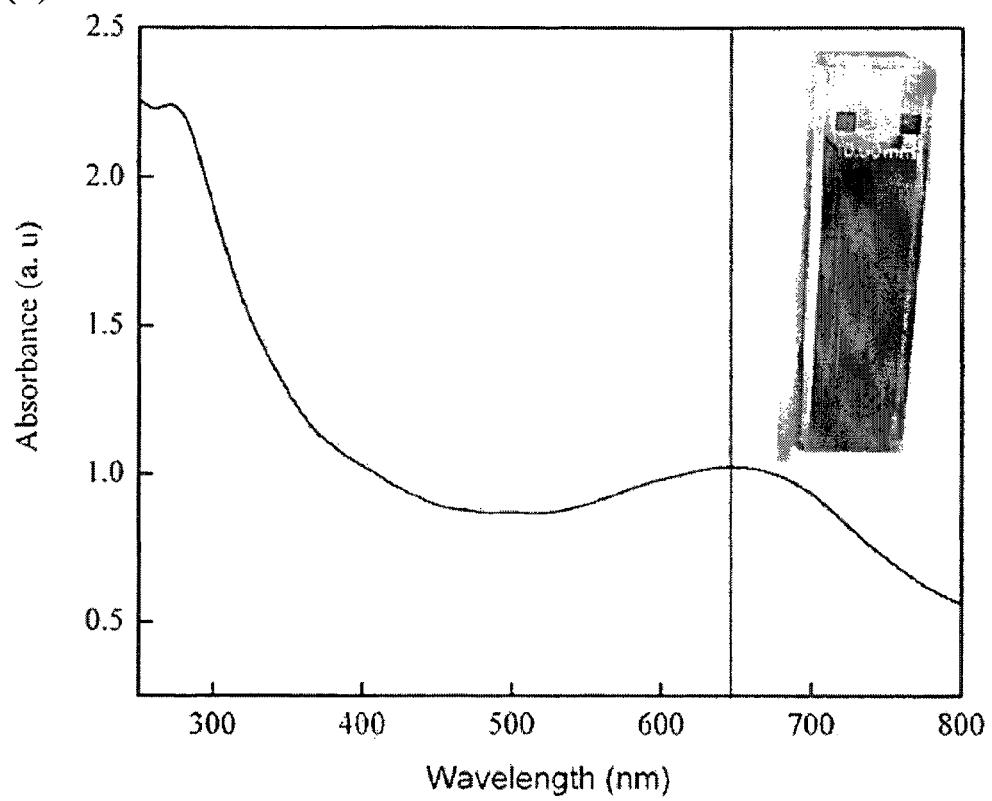
FIG. 23 are graphs showing (A) UV-vis spectra of I (DB71) after separation with SWNTs; and (B) UV-vis spectra of fresh I solution.
Figure 23:
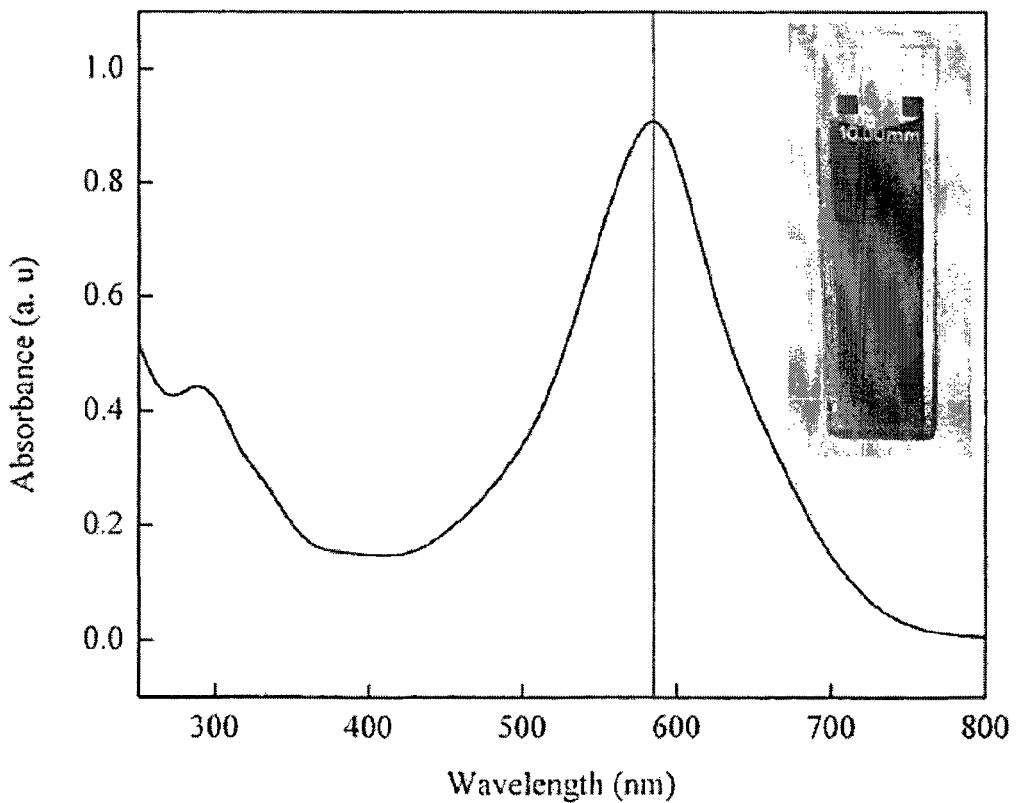

After probe sonication of SWNT in I solution, the sample (SWNT+I) was centrifuged at high speed to remove insoluble materials, and the supernatant was taken for UV-vis absorbance measurement. As shown in FIG. 23A, Supt-SWNT/I showed unique absorbance maximum spectrum at 647 nm. Before dispersion, UV-vis spectra of I solution was at 585 nm, which is a characteristic absorption peak of I. It was noted that I molecule structure was highly suitable to prepare a stable dispersion of SWNTs, which also may work like a surfactant. After adsorption of I onto SWNT, absorption peak of I shifted from 585 nm (blue) to 647 nm (light green solution) (FIG. 23), which confirmed a charge-transfer reaction between I and SWNTs.

Example 21

Results of FET Tests (Embodiment 2)

Figure 19:
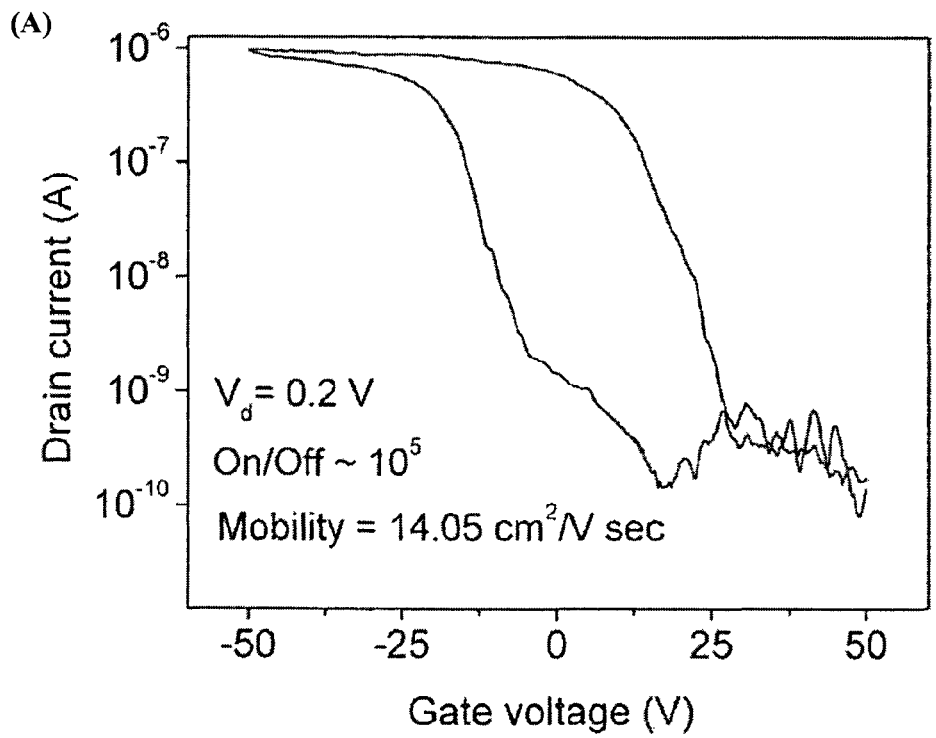
FIG. 19 are graphs showing (A) transfer characteristics of a representative s-SWNT FET device at $V_{ds}$=0.2 V; and (B) histogram graph depicting a relationship between percentage of fabricated FET devices versus on/off ratio for (i) FETs fabricated with enriched semiconductor SWNTs (s-SWNT/FETs), and (ii) FETs fabricated with pristine SWNTs (P2-SWNT/FETs).
Figure 19:
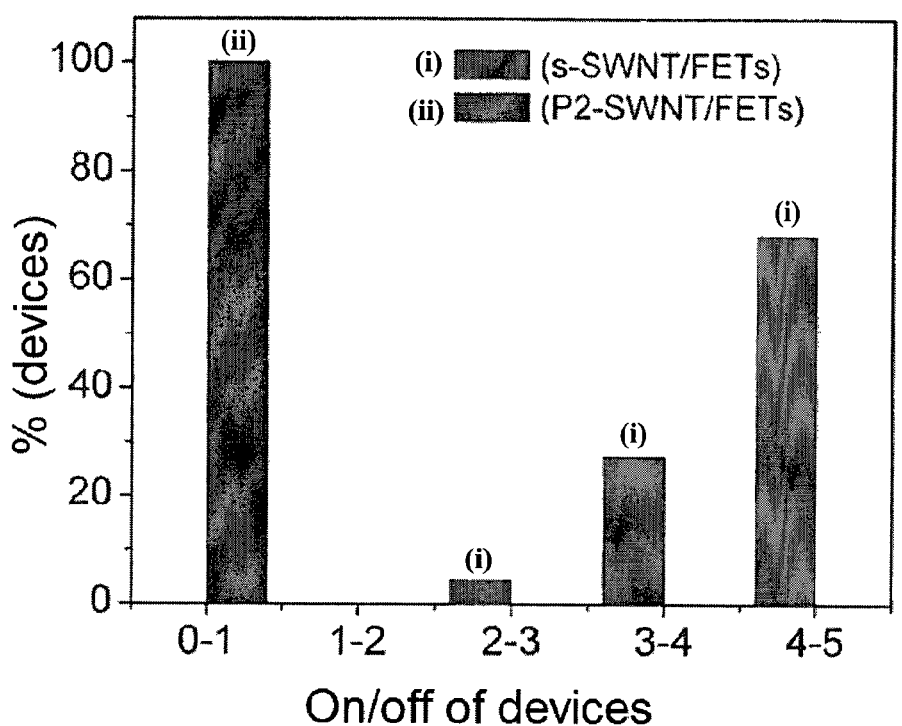

A final demonstration of the operation of semiconducting-SWNT transistors is shown in FIG. 19A. Field effect transistor (FET-like) devices were fabricated (FIG. 19A, inset, gate oxide $SiO_2$ layer=500 nm) using the s-SWNT through alternating current (AC-) dielectrophoresis method (FIG. 10). A frequency generator with $V_{p-p}$=5 V at f=2 MHz was used for bridging electrodes. The channel length of the devices was L=2-3 μm. 10 μL of the nanotube suspension was placed on the electrode using a pipette and left for 10 sec under AC-dielectric field.

Figure 24:
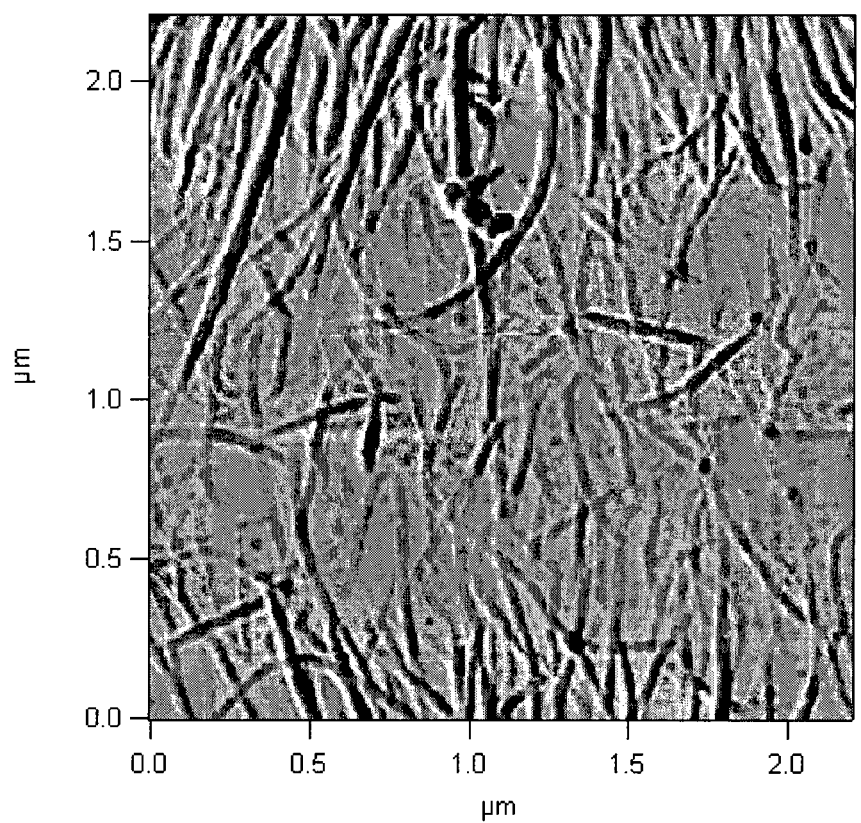
FIG. 24 is an Atomic Force Microscopy (AFM) image of (AC-) dielectrophoresis method of field-effect transistor fabrication.

After 10 sec, the s-SWNT suspension was blown gently off, and the sample was characterized by atomic force microscopy (AFM). AFM imaging of the devices showed that the average nanotube connections of each device were N=25 tubes (FIG. 24). Some of the nanotubes were directly bridging the source and drain electrodes, and high fraction of tubes showed connection to the electrodes by cross-linking through each other. The s-SWCNT tubes appeared to be quite straight and were aligned parallel to one another. This kind of network devices is in demand for flexible electronics and sensors. The resistance of the s-SWNT devises was approximately −3-4 MΩ. In FIG. 19A, the electrical properties of a back-gated s-SWNT devices are shown. The as prepared device was a p-type FET with $I_{on}$~1 μA, and the threshold slope was 1000 mV/decade. More than 25 such FET devices based on the separated s-SWNTs were investigated, and the overall on/off ratio was found to be around $10^5$ and the estimated hole mobility obtained was 14.05 $cm^2/Vs$.

The observed relationship between the devises prepared from s-SWNT and measured on/off ratios of various devices is summarized in FIG. 19B. The plots represent the results of devices constructed using (AC-) dielectrophoresis. For comparison, FET devices were also prepared using pristine-P2-SWNT solution with the same procedure, and found that on/off ratio of all devices were around <1 order (FIG. 19B). The relatively high mobility observed above indicated that the as-prepared semiconducting SWNT network could transport electrons efficiently. The present method represents a simple and convenient way to fabricate high performance solution processable CNT-FET devices.

Present findings point to a totally new family of selective chemicals based functionalized polycyclic aromatic-based azo dyes. The relatively stable radicals produced appear to preferentially attack m-SWNTs and the functionalized polycyclic aromatic group selectively suspends/solubilizes s-SWNTs.

Semiconducting SWNT fractions from arc-discharge P2-SWNTs have been enriched using I as an exemplary embodiment, which functions as a separating agent and is the first reported example of a new class of separation agent based on azo compound dispersant. Raman and UV-VIS-NIR results confirm that metallic SWNTs are depleted from the semiconducting enriched Supt-SWNTs samples. Highly pure, 96% semiconducting, nanotubes with high yield (42%) may be obtained via a method according to embodiments of the first aspect using centrifugation.

XPS and Raman results confirm the preferential molecular charge transfer of undecomposed I with s-SWNTs. Based on MALDI-TOF-MS and density functional calculations analysis, it was found that degradation products of I preferentially react with metallic-SWNTs. According to the experiments performed, I is a naphthalene azo dispersing agent that adsorbs preferentially on semiconducting nanotubes but decomposes slowly to form fairly stable radicals that preferentially react with metallic nanotubes, so that the DP-I/m-SWNT hybrids settle under centrifugation. Semiconducting SWNTs are selectively stabilized, suspended and separated from m-SWNTs.

Moreover, p-type pure semi-conducting FET devices with good ON/OFF ratio, and excellent field effect mobility have been demonstrated. Methods according to various embodiments are simple for the separation of semiconducting SWNTs with high-yield. With density gradient ultracentrifugation, 99% semiconducting SWNTs may be obtained with a single pass of purification. This simple and inexpensive novel selective chemical separation method may be easily employed for large scale production of semiconducting nanotubes for electrical and electronic applications.

The invention claimed is:

1. A method of enriching specific species of carbon nanotubes by exposing a composition of carbon nanotubes comprising semiconductor carbon nanotubes and metallic carbon nanotubes to an azo compound, the azo compound having the chemical formula (I) or a salt thereof

wherein
at each occurrence, A is an optionally substituted naphthalene; B is the same as A or different from A and is an optionally substituted naphthalene; and
n is 2 or 3;
the method comprising
a) mixing the azo compound with a suspension comprising the composition of carbon nanotubes to form a mixture;
b) incubating the mixture to react the azo compound with the carbon nanotubes, whereby a supernatant enriched with semiconductor carbon nanotubes and a precipitate enriched with metallic carbon nanotubes are formed in the mixture; and
c) separating the supernatant and the precipitate formed in the mixture.

2. The method according to claim 1, wherein, the optionally substituted naphthalene is naphthalene optionally substituted with one or more electron withdrawing groups selected from the group consisting of a sulfonate group, an amino group, a hydroxy group, a halide group, a nitro group, a carboxylate group, a thiol group, and an unsaturated alkyl group.

3. The method according to claim 1, wherein the azo compound comprises:

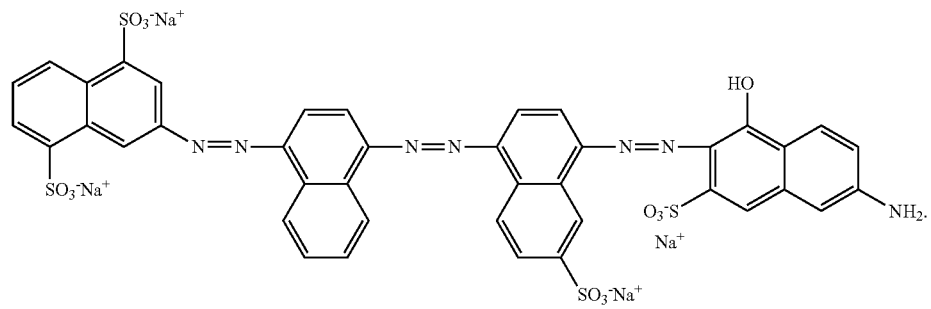

4. The method according to claim 1, wherein the carbon nanotubes are single-walled carbon nanotubes.

5. The method according to claim 4, wherein the single-walled carbon nanotubes are enriched according to their electronic properties.

6. The method according to claim 5, wherein enrichment according to electronic properties allows separation of metallic single-walled carbon nanotubes from semiconductor single-walled carbon nanotubes.

7. The method according to claim 1, wherein mixing the azo compound with the suspension comprising the composition of carbon nanotubes is carried out by sonicating or stirring or shaking the mixture.

8. The method according to claim 1, wherein the mixture is left to stand during incubating the mixture to react the azo compound with the carbon nanotubes.

9. The method according to claim 1, wherein incubating the mixture to react the azo compound with the carbon nanotubes is carried out for a period of time of between about 24 hours to about 4 weeks.

10. The method according to claim 9, wherein incubating the mixture to react the azo compound with the carbon nanotubes is carried out for a period of time of about 5 days.

11. The method according to claim 1, wherein separating the supernatant and the precipitate formed in the mixture comprises centrifuging the mixture.

12. The method according to claim 1, wherein the carbon nanotubes in the precipitate and/or the supernatant are washed with an aqueous solution after separation.

13. The method according to claim 1, further comprising heating the mixture prior to step b).

14. The method according to claim 13, wherein the mixture is heated at a temperature of about 50° C. to about 90° C.

* * * * *